United States Patent
Joffe et al.

(10) Patent No.: US 7,055,151 B1
(45) Date of Patent: May 30, 2006

(54) SYSTEMS AND METHODS FOR MULTI-TASKING, RESOURCE SHARING AND EXECUTION OF COMPUTER INSTRUCTIONS

(75) Inventors: Alexander Joffe, Palo Alto, CA (US); Dmitry Vyshetsky, Cupertino, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 09/458,551

(22) Filed: Dec. 9, 1999

Related U.S. Application Data

(62) Division of application No. 09/055,033, filed on Apr. 3, 1998, now Pat. No. 6,330,584.

(51) Int. Cl.
 *G06F 9/46* (2006.01)

(52) U.S. Cl. ............. 718/104; 718/100; 718/102; 710/200; 712/228; 712/229

(58) Field of Classification Search ............. 718/100, 718/101, 102, 103, 104, 106, 107; 712/226, 712/228, 229, 230; 710/140
See application file for complete search history.

(56) References Cited

U.S. PATENT DOCUMENTS

| | | | |
|---|---|---|---|
| 2,686,844 A | | 8/1954 | Brewer |
| 4,604,694 A | * | 8/1986 | Hough ..................... 710/200 |
| 4,797,816 A | * | 1/1989 | Uchiyama et al. .......... 711/220 |
| 4,885,744 A | | 12/1989 | Lespagnol et al. .......... 370/466 |
| 5,062,106 A | | 10/1991 | Yamazaki ................... 270/417 |
| 5,175,732 A | * | 12/1992 | Hendel et al. ............. 370/463 |
| 5,233,606 A | | 8/1993 | Pashan et al. ............. 270/418 |
| 5,261,062 A | | 11/1993 | Sato ........................... 395/375 |
| 5,311,509 A | | 5/1994 | Heddes et al. ............. 370/397 |
| 5,337,308 A | | 8/1994 | Fan ............................ 270/414 |
| 5,357,617 A | | 10/1994 | Davis et al. ................ 395/375 |
| 5,361,337 A | * | 11/1994 | Okin .......................... 712/228 |
| 5,457,687 A | | 10/1995 | Newman .................... 370/85.3 |
| 5,517,495 A | | 5/1996 | Lund et al. .................. 370/60 |
| 5,528,588 A | | 6/1996 | Bennett et al. .............. 370/60 |
| 5,541,912 A | | 7/1996 | Choudhury et al. .......... 370/17 |
| 5,555,264 A | | 9/1996 | Sallberg et al. .............. 370/17 |
| 5,557,611 A | | 9/1996 | Cappellari et al. .......... 270/414 |
| 5,583,863 A | | 12/1996 | Darr, Jr. et al. ............. 370/397 |
| 5,592,476 A | | 1/1997 | Calamvokis et al. ....... 270/413 |
| 5,629,928 A | | 5/1997 | Calvignac et al. .......... 370/237 |

(Continued)

FOREIGN PATENT DOCUMENTS

JP     3101551     4/1991

(Continued)

OTHER PUBLICATIONS

Dynamic Instruction Stream Computer, Dr. Marion daniel Nemirovsky, Apple Computer Corporation, 1991.*

(Continued)

*Primary Examiner*—Majid Banankhah
(74) *Attorney, Agent, or Firm*—Michael Shenker; MacPherson Kwok Chen & Heid LLP

(57) ABSTRACT

In a multi-tasking pipelined processor, consecutive instructions are executed by different tasks, eliminating the need to purge an instruction execution pipeline of subsequent instructions when a previous instruction cannot be completed. The tasks do not share registers which store task-specific values, thus eliminating the need to save or load registers when a new task is scheduled for execution. If an instruction accesses an unavailable resource, the instruction becomes suspended, allowing other tasks' instructions to be executed instead until the resource becomes available. Task scheduling is performed by hardware; no operating system is needed. Simple techniques are provided to synchronize shared resource access between different tasks.

37 Claims, 15 Drawing Sheets

U.S. PATENT DOCUMENTS

| | | | |
|---|---|---|---|
| 5,633,859 A | 5/1997 | Jain et al. | 370/234 |
| 5,633,867 A | 5/1997 | Ben-Num et al. | 370/399 |
| 5,689,508 A | 11/1997 | Lyles | 370/391 |
| 5,704,047 A | 12/1997 | Schneeberger | 395/200.65 |
| 5,715,250 A | 2/1998 | Watanabe | 370/395 |
| 5,719,853 A | 2/1998 | Ikeda | 370/229 |
| 5,748,629 A | 5/1998 | Caldara et al. | 370/413 |
| 5,751,951 A | 5/1998 | Osborne et al. | 395/200.8 |
| 5,809,024 A | 9/1998 | Ferguson et al. | 370/395 |
| 5,838,968 A * | 11/1998 | Culbert | 718/104 |
| 6,018,759 A | 1/2000 | Doing et al. | 709/108 |
| 6,591,358 B1 * | 7/2003 | Jaffrey | 712/32 |

FOREIGN PATENT DOCUMENTS

| | | |
|---|---|---|
| JP | 10049390 | 2/1998 |
| WO | WO 95/20182 | 7/1995 |
| WO | WO 95/32570 | 11/1995 |

OTHER PUBLICATIONS

"Structured Computer Organization", Second Edition, "Andrew Tanenbaum", 1984 by Prentic Hall.*

Farrens M. K. et al.: "Strategies For Achieving Improved Processor Throughput", Computer Architecture News, Association For Computing Machinery, New York, US, vol. 19, No. 3, May 1, 1991, pp. 362-369.

Lee E. A. et al: "Pipeline Interleaved Programmable DSP's: Architecture", IEEE Transactions On Acoustics, Speech And Signal Processing, IEEE Inc. New York, US, vol. 35, No. 9, Sep. 1, 1987, pp. 1320-1333.

Nemirovsky M. D. et al.: "Disc: Dynamic Instruction Stream Computer", Proceedings Of The Annual International Symposium On Microarchitecture, XX, XX, 1991, pp. 163-171.

Allyn Romanow et al. "Dynamics of TCP Traffic Over ATM Networks" *IEEE Journal on Selected Areas in Communications*, vol. 13, No. 4, pp. 633-541, May 1995.

Alan Demers et al. "Analysis and Simulation Of A Fair Queueing Algorithm" © 1989 ACM, pp. 1-12.

"ATMS2003B Switch Controller 1 "White"", *MMC Networks*, Dec. 1995, 32 pages.

Beraldi, R., et al: "Selective BECN Schemes for Congestion Control of ABR Traffic in ATM Lan", *1996 IEEE Int'l Conf. on Communications (ICC), Converging Technologies for Tomorrow's Applications*, Dallas, Jun. 23-27, 1996. pp. 503-507.

Dutton, Harry, J.R. and Lenhard, Peter, "Asynchronous Transfer Mode (ATM) Technical Overview" (IBM, Prentice-Hall PTR, New Jersey, 1995), pp. 3-1 through 3-.

Flanagan, William A., "ATM (Asyncrhronous Transfer Mode) User's Guide," (Flatiron Publishing, Inc. New York, 1994), pp. 25-49.

Hongqing Li et al. "A Simulation Study of TCP Performance in ATM Networks With ABR and UBR Services" *Proceedings vol. 3, 1996 IEEE Infocom '96, Fifteenth Annual Joint Conference of the IEEE Computer and Communications Societies*, Mar. 24-28, 1996, pp. v-xvi and pp. 1269-1276 (21 pages total including cover page).

Hongqing, Li, et al.: "Performance of TCP Over UBR Service in ATM Networks With Per-VC Early Packet Discard Schemes" *Proceedings of the 1996 IEEE 15th Annual Int' Phoenix Conf. on Computers and Communication*, Mar. 27-29, 1996, pp. 350-357.

Ozveren, C., et al: "Reliable and Efficient Hop-By-Hop Flow Control", *Computer Communications Review*, vol. 24, No. 4, Oct. 1, 1994, pp. 89-100.

Tanenbaum, Andrew S., "Computer Networks" (Prentice Hall PTR, 3rd Ed., 1996) pp. 148-150.

* cited by examiner

| Inst. no. | Clk: | 0 | 1 | 2 | 3 | 4 | 5 | 6 | 7 | 8 | 9 | 10 |
|---|---|---|---|---|---|---|---|---|---|---|---|---|
| 1 | HT0 | t0 TS | t1 F | t2 D | t3 R(s) | t4 E | t5 WB | t6 WR | | | | |
| 2 | HT1 | | TS | F | D | R(s) | E | WB | WR | | | |
| 3 | HT2 | | | TS | F | D | R(s) | E | WB | WR | | |
| 4 | HT3 | | | | TS | F | D | R(s) | E | WB | WR | |
| 5 | HT0 | | | | | t0 TS | t1 F | t2 D | t3 R(s) | t4 E | t5 WB | t6 WR |

SYSTEMS AND METHODS FOR MULTI-TASKING, RESOURCE SHARING AND EXECUTION OF COMPUTER INSTRUCTIONS

CROSS REFERENCE TO RELATED APPLICATIONS

The present application is a division of U.S. patent application Ser. No. 09/055,033 filed Apr. 3, 1998, now U.S. Pat. No. 6,330,584, and incorporated herein by reference.

STATEMENT REGARDING FEDERALLY SPONSORED RESEARCH OR DEVELOPMENT

Not applicable.

BACKGROUND OF THE INVENTION

The present invention relates to data processing, and more particularly to pipelined instruction execution, multi-tasking, and resource access techniques.

Pipelining and multi-tasking increase processor bandwidth. It is desirable to reduce the time and complexity associated with these techniques.

In particular, when instruction execution is pipelined, the processor may start executing an instruction before it is known whether the instruction should be executed. For example, suppose the processor starts executing an instruction I1, and then starts executing an instruction I2 before the I1 execution is finished. If the I1 execution cannot be completed, the instruction I2 should not be executed and has to be purged from the pipeline. In fact, at any given time, the processor may be executing more than one instruction that have to be purged from the pipeline. It is desirable to reduce the circuit complexity associated with pipeline purging.

It is also desirable to reduce the overhead associated with switching between different tasks in multi-tasking environments. To switch tasks, the operating system executed by the processor has to determine which task is to be executed next. The operating system also has to save register values used by one task and load the registers with values used by another task. These functions can involve a fair number of operating system instructions. It is desirable to reduce the number of instructions associated with these operations.

It is also desirable to improve access to resources which maybe unavailable. An example of such a resource is a FIFO which may be empty when a processor is trying to read it, or which may be full when the processor is trying to write the FIFO. Before accessing the FIFO, the processor polls a flag indicating whether the FIFO is available. It is desirable to improve the speed of accessing a resource which may be unavailable.

It is also desirable to provide simple synchronization methods to synchronize use of computer resources by multiple tasks to avoid errors that could be caused by a task accessing a resource when the resource is set for access by a different task.

SUMMARY

The present invention provides in some embodiments efficient pipeline processors, multi-tasking processors, and resource access techniques.

In some instruction execution pipeline embodiments, the pipeline purge overhead is reduced or eliminated by limiting the number of instructions that the processor can execute in a row for any given task. Thus, in some embodiments, consecutive instructions are executed by different tasks. Therefore, if an instruction cannot be executed, the next instruction still has to be executed because the next instruction belongs to a different task. Therefore, the next instruction is not purged from the pipeline.

In some embodiments, between any two instructions of the same task the processor executes a sufficient number of instructions from different tasks to eliminate any need for pipeline purging.

To reduce the overhead associated with task switching, some embodiments include separate registers for each task so that the register values do not have to be saved or restored in task switching operations. In particular, in some embodiments, each task has a separate program counter (PC) register and separate flags. In some embodiments, the task switching is performed by hardware in one clock cycle.

In some embodiments, a processor can access a resource without first checking whether the resource is available. If the resource is unavailable when the processor executes an instruction accessing the resource, the processor suspends the instruction, and the processor circuitry which was to execute the instruction becomes available to execute a different instruction, for example, an instruction of a different task.

Thus, in some embodiments, the processor keeps track of the state of all the resources (for example, FIFOs). (Unless specifically stated otherwise, the word "resource" as used herein means something that may or may not be available at any given time.) Signals are generated indicating the state of each resource, and in particular indicating which resource is available to which task. If a task attempts to access an unavailable resource, the task is suspended, and the processor can execute other tasks in the time slot that could otherwise be used by the suspended task. When the resource becomes available, the suspended task is resumed, and the instruction accessing the resource is re-executed.

To avoid synchronization errors when multiple tasks share one or more resources, in some embodiments after a task has finished accessing any one of the resources, the task does not get access to the same resource until after every other task sharing the resource has finished accessing the resource. Thus, in some network embodiments, different tasks share FIFO resources to process frames of data. Each task processes a separate frame of data. To process the frame, the task reads the frame address from a "request" FIFO. Then the task writes a command FIFO with commands to a channel processor to process the frame. A second task performs similar operations for a different frame. The first task again performs the same operations for a still different frame. If commands written for one frame get erroneously applied to another frame, the frames could be misprocessed.

To eliminate this possibility and to allow accurate matching between the frame addresses in the request FIFO and the commands in the command FIFO, the following technique is used. First one task (say, T1) is allowed to access both the request FIFO and the command FIFO, but no other task is allowed to access these resources. Once the task T1 has finished accessing any resource, the resource is allowed to be accessed by another task, and further the task T1 will not be allowed to access the resource again until every other task sharing the resource has finished accessing the resource. Therefore, the order of frame addresses in the request FIFO corresponds to the order of commands in the command FIFO, allowing the channel to accurately match the frame addresses with the commands. No special tag is needed to establish this match, and the match is established using FIFOs, which are simple data structures.

In some embodiments, a processor executes several tasks processing network data flows. The processor uses pipeline and task-switching techniques described above to provide high bandwidth.

Other embodiments and variations are described below. The invention is defined by the appended claims.

DESCRIPTION OF PREFERRED EMBODIMENTS

Figure 1:
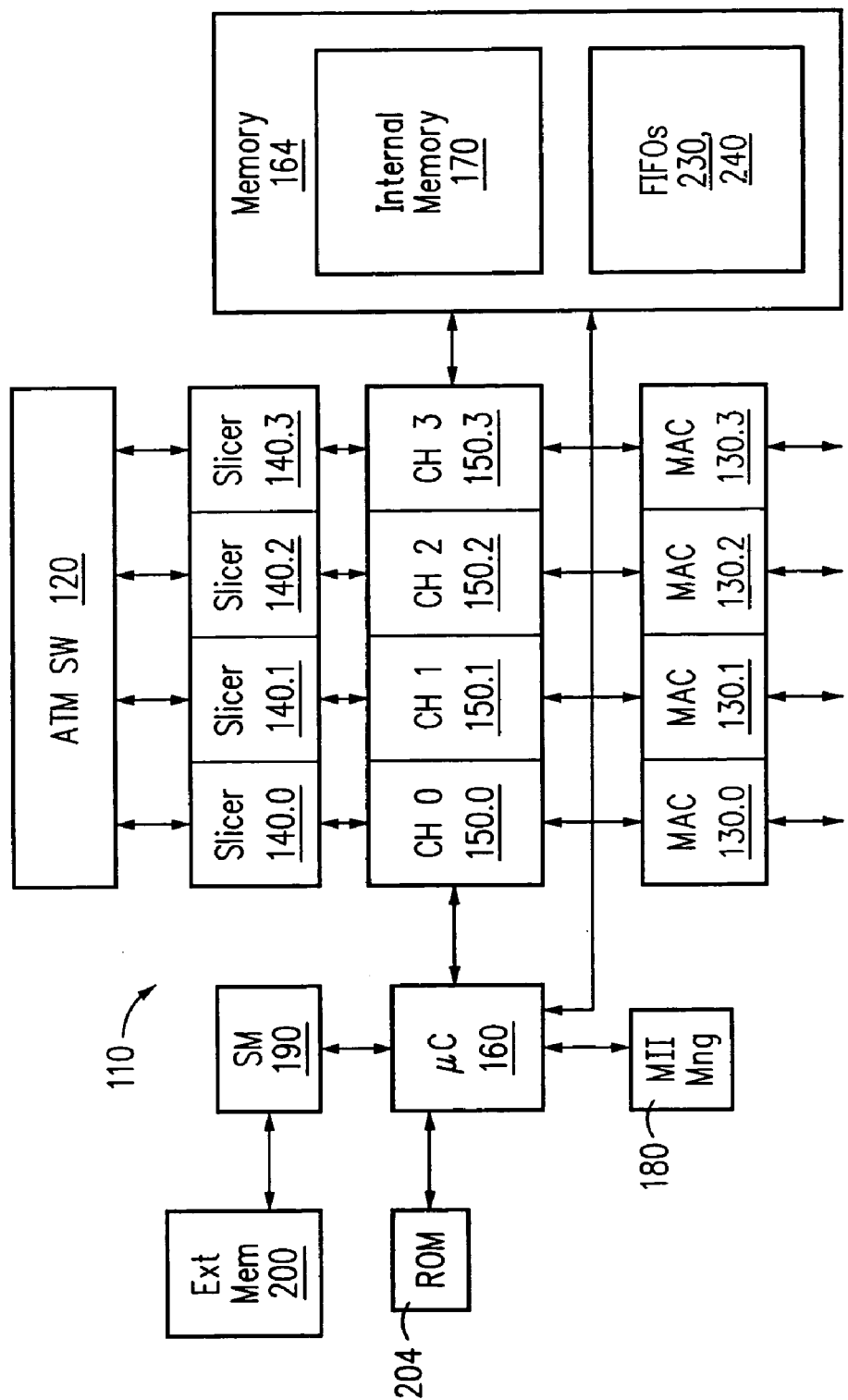
FIG. 1 is a block diagram of a system including a processor according to the present invention.

FIG. 1 illustrates a port interface (PIF) circuit 110 including a pipelined multi-tasking processor (microcontroller) 160. Port interface 110 includes four full-duplex ports that provide an interface between ATM switch 120 and respective four Ethernet segments (not shown) each of which is connected to a corresponding MAC 130.0–130.3. In each port "x" (x=0,1,2,3) the data between the Ethernet segment and the ATM switch 120 flows through a corresponding MAC 130.x and a corresponding slicer 140.x. The slicer performs the well-known ATM SAR function, segmenting the Ethernet frame into ATM cells and appending ATM headers to the cells on the way to ATM, and assembling the frame from the cells on the way to the Ethernet. In some embodiments, the ATM switch interface to PIF 110 operates in frame mode in which the ATM switch transmits a frame of cells to a slicer 140 with no intervening cells. Slicers 140 use the AAL-5 protocol. The frame mode is described, for example, in U.S. patent application Ser. No. 08/706,104 "Cell Queuing in ATM Switches" filed Aug. 30, 1996 by A. Joffe et al., now U.S. Pat. No. 6,128,278. See also PCT application PCT/US97/14821 filed Aug. 28, 1997 and incorporated herein by reference.

Other embodiments of PIF 110 provide interface between other networks, not necessarily ATM or Ethernet. In some embodiments, the slicers 140 are replaced by suitable MACs.

In addition to performing protocol transformations (e.g. ATM/Ethernet transformations), PIF 110 can perform IP routing, layer-2 switching, or other processing as determined by the software executed by the PIF microcontroller 160. See the description below in connection with FIGS. 3A, 3B. See also U.S. patent application Ser. No. 09/055,044 "SYSTEMS AND METHODS FOR DATA TRANSFORMATION AND TRANSFER IN NETWORKS" (now U.S. Pat. No. 6,307,860), filed by A. Joffe et al. on Apr. 3, 1998 and incorporated herein by reference.

PIF 110 has high throughput even at modest clock rates. Thus, in some embodiments, PIF 110 can perform IP routing for four 100 MB/sec Ethernet ports and respective four 155 MB/sec ATM ports at a clock rate of only 50 MHz.

In FIG. 1, the data flow between each slicer 140.x and the corresponding MAC 130.x is controlled by a corresponding channel 150.x (also called channel "x" below, i.e. channel 0, 1, 2 or 3). The channels 150 executes commands from microcontroller 160. In some embodiments, the four channels 150.x are implemented by a single channel circuit that performs the function of the four channels 150 using time division multiplexing. See the aforementioned U.S. patent application Ser. No. 09/055,044, "SYSTEMS AND METHODS FOR DATA TRANSFORMATION AND TRANSFER IN NETWORKS" incorporated herein by reference.

The channels, the microcontroller, the slicers 140 and the MACs 130 communicate through memory 164 which includes internal memory ("frame and command memory") 170 and FIFOs 230, 240 described below.

In some Ethernet embodiments, the microcontroller is connected to MII (media independent interface) management circuit 180 connected to the Ethernet physical layer devices known in the art.

Search machine (SM) 190 maintains an address resolution database in memory 200 to do IP routing or other processing as determined by the software. SM 190 also maintains databases in memory 200 that restrict the network connectivity (e.g. by defining VLANs or access control lists). The search machine is able to search for a key (e.g. an Ethernet or IP address) presented to it by the microcontroller 160, and execute a learning algorithm to learn a layer-2 or layer-3 address if the address is not in the database. While search machine 190 is not software programmable in some embodiments, the search machine supports flexible database node structure allowing the search machine to be easily adapted to different functions (e.g. IP routing, layer-2 switching). Search machine 190 executes commands from the microcontroller, such as Search, Insert, Delete, etc. The search machine also provides the microcontroller with direct access to memory 200. The search machine is described in Addendum 8.

In some embodiments, memory 200 is implemented using synchronous static RAMs in flow through mode of operation. Multiple banks of memory are used in some embodiments.

In some embodiments, PIF 110 is an integrated circuit. Memory 200 is called "external" because it is not part of the integrated circuit. However, in other embodiments, memory 200 is part of the same integrated circuit. The invention is not limited by any particular integration strategy.

PIF 110 is also connected to a serial read only memory (ROM) 204 (serial EPROM in some embodiments) to allow the software ("firmware") to be loaded from ROM 204 into the microcontroller at boot time.

Figure 2:
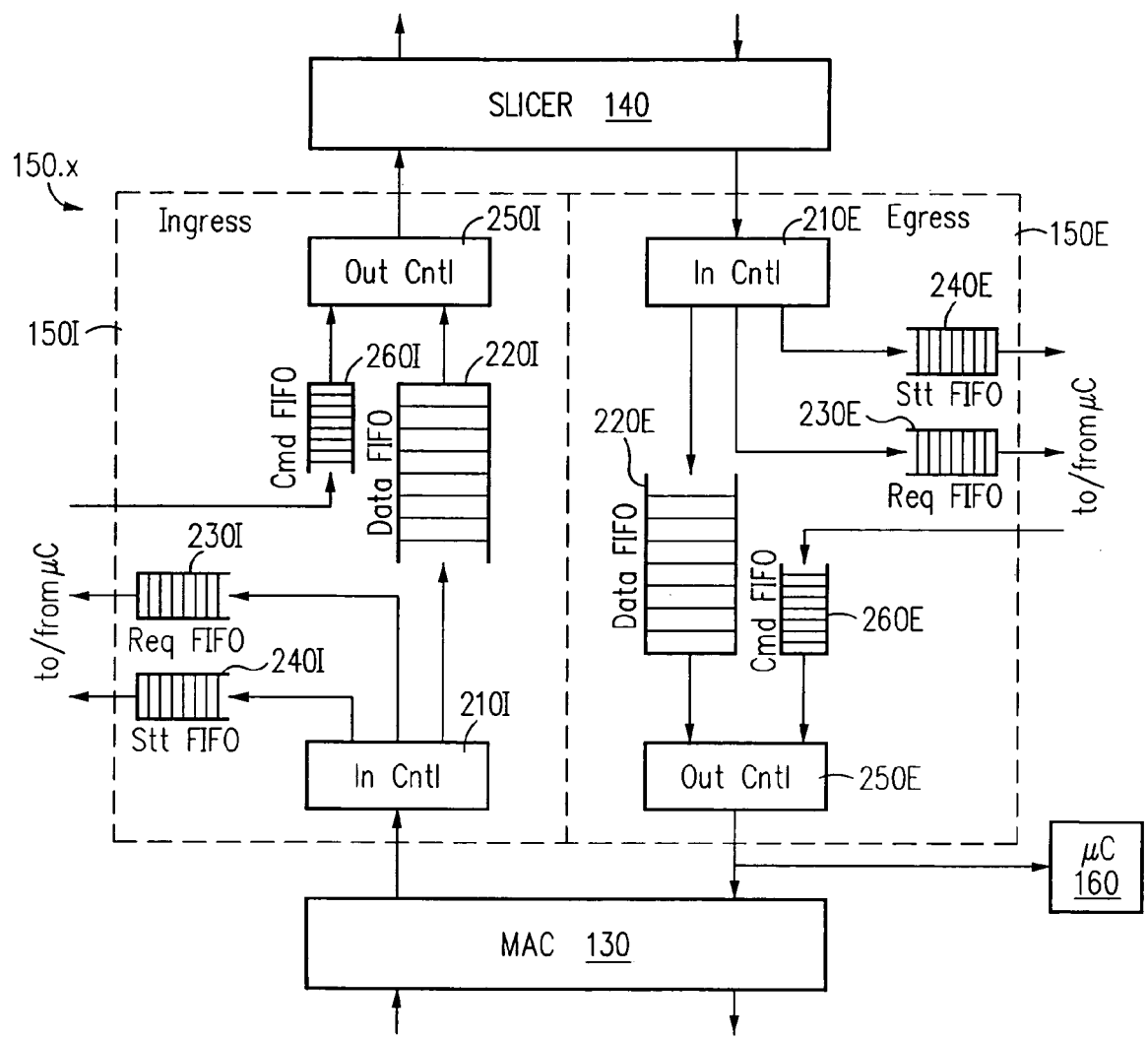
FIG. 2 is a block diagram illustrating resources in the system of FIG. 1.

FIG. 2 illustrates a single channel 150.x and associated FIFO resources in memory 164. The channel is divided into two similar parts: ingress sub-channel 150I that controls the data flow from the corresponding MAC 130 to the corresponding slicer 140; and egress sub-channel 150E that controls the data flow from slicer 140 to MAC 130. In reference numerals, suffix "I" indicates circuits belonging to the ingress sub-channel, and suffix "E" indicates circuits belonging to the egress sub-channel, unless noted otherwise.

In each sub-channel 150I, 150E the data processing includes the following steps:

(1) The corresponding input control block 210 (i.e. 210I or 210E) stores the incoming data in the corresponding data FIFO 220. When a sufficient portion of a data frame has been received to enable the microcontroller to start address translation or other processing (e.g., when the IP address and hop count have been received in IP routing embodiments), input control 210 writes a request to respective request FIFO 230. The number of frame bytes received before the request is written to FIFO 230 is defined by microcontroller-writable registers as described in the aforementioned U.S. patent application Ser. No. 09/055,044.

(2) Microcontroller 160 reads the request, reads appropriate parameters (for example, the source and destination addresses on the ingress side or the VPI/VCI on the egress side) from the corresponding data FIFO 220, and performs appropriate processing. The microcontroller uses the search machine 190 as needed to perform, for example, address resolution searches.

(3) When the search machine 190 has returned the search results to microcontroller 160, the microcontroller writes one of more channel commands to respective command FIFO 260 which specifies how the frame is to be transferred to the output device (MAC 130 or slicer 140).

(4) After the entire frame was received, the input control 210 writes status information to respective status FIFO 240. The status FIFO is read by microcontroller 160. If the status shows that the frame is bad (for example, the checksum is bad), the microcontroller writes to command FIFO 260 a "discard" command to cause the output control 250 to discard the frame.

Steps (2), (3) and (4) may involve other processing described below in connection with FIGS. 3A, 3B.

(5) Output control 250 executes commands from respective command FIFO 260.

In some embodiments, data FIFOs 220 and command FIFOs 260 are stored in internal memory 170. Request FIFOs 230 and status FIFOs 240 are stored in memory 230, 240 (FIG. 1).

The outputs of egress output control blocks 250E are connected to the microcontroller to enable the ATM switch 120 to load programs ("applets") into the microcontroller for execution. The applets are first transferred to the egress side similarly to other frames, but their VPI/VCI parameters indicate the microcontroller. Hence, the applets are not transferred to MACs 130. Instead, the applets are loaded from the output of circuits 250E to the microcontroller program memory 314 (FIG. 5) by a DMA transfer.

Microcontroller 160 can also generate its own frames, write them to any data FIFO 220, and write commands to the corresponding command FIFO 260. The corresponding output control 250 will transfer the frames as specified by the commands.

The microcontroller can also write command FIFOs 260 with commands to transfer statistics information stored in a separate memory (not shown) for each sub-channel 150I, 150E.

In some embodiments, microcontroller 160 is an expensive resource. Of note, in some embodiments the microcontroller instruction execution unit (shown at 310 in FIG. 5 and described below) accounts for about 70% of the gate count of PIF 110. Therefore, it is desirable to fully load the microcontroller. Full loading is achieved by appropriate multi-tasking as follows.

The microcontroller executes four "hardware tasks" HT0, HT1, HT2, HT3, one for each port 0, 1, 2, 3. The hardware tasks are executed in time division multiplexing manner as shown in the following table:

TABLE 1

| Clock Cycle   | 1   | 2   | 3   | 4   | 5   | 6   |
|---------------|-----|-----|-----|-----|-----|-----|
| Hardware Task | HT0 | HT1 | HT2 | HT3 | HT0 | HT1 |

If a hardware task is not available (because, for example, it is waiting for the search machine), no microcontroller instruction is started in the respective clock cycle.

Each hardware task includes one or more software tasks. Each software task contains code that processes an entire frame. Since a frame on the ingress side and a frame on the egress side can arrive in parallel, in some embodiments each hardware task includes at least two software tasks to allow parallel processing of at least two frames. In some embodiments, different software tasks are provided for the ingress and egress sides. When an ingress software task cannot execute due, for example, to the microcontroller waiting for the search machine, the microcontroller can execute the egress software task, and vice versa.

Below, the term "task" means a software task unless we specifically recite a "hardware task".

Figure 3A:
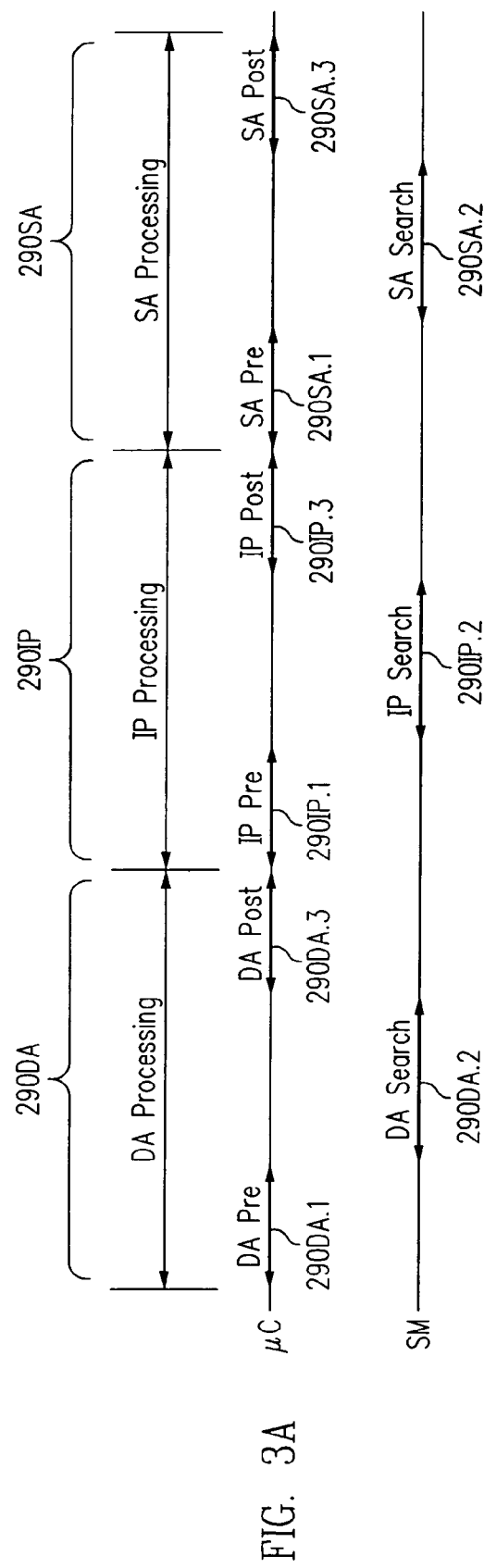
FIGS. 3A, 3B are timing diagrams illustrating data frame processing in the system of FIG. 1.

FIG. 3A illustrates layer-3 processing of a single frame by an ingress task. At stage 290DA, the microcontroller reads from the frame the Ethernet (MAC) destination address DA at sub-stage 290DA.1. The microcontroller supplies the address to search machine 190, which performs the search at sub-stage 290DA.2.

At sub-stage 290DA.3, the microcontroller examines the search results. If the DA was not found, the frame will be dropped or broadcast. If the DA was found and the search machine recognized the DA as an address of a final destination station, the search results will include the VPI/VCI of the virtual connection (VC) on which the frame is to be transmitted to the final destination. In that case, the IP stage 290IP will be skipped. If the search results indicate that the DA is an address assigned to an IP routing entity, IP processing is performed at stage 290IP.

At that stage, the microcontroller reads the IP destination address from the frame at sub-stage 290IP.1. The search machine performs a search on that address at stage 290IP.2. The microcontroller examines the search results at sub-stage 290IP.3. The results include the VPI/VCI and, possibly, access control restrictions. At sub-stage 290IP.3, the microcontroller matches the access control restrictions with the IP source address to determine if the frame is allowed. If not, the frame will be dropped.

At stage 290SA, the Ethernet source address SA is processed to implement an address learning algorithm and also to implement VLANs. More particularly, at sub-stage 290SA.1, the search machine performs a search on the SA. The search machine inserts or amends the SA data if required by the learning algorithm. At sub-stage 290SA.2, the search machine returns the VLAN to which the SA belongs. At sub-stage 290SA.3, the microcontroller compares that VLAN with the DA VLAN returned by the search machine at stage 290DA.2. If the Ethernet source and destination addresses belong to different VLANs, the frame is dropped.

At one or more of sub-stages 290DA.3, 290IP.3, 290SA.3, the microcontroller writes commands to the command FIFO 260I for the respective data flow (i.e. respective sub-channel). The commands may instruct the channel 150 to drop the frame, or to forward the frame to respective slicer 140. If the frame is forwarded, the channel may supply the VPI/VCI to the slicer and, possibly, increment the IP hop count and/or replace the source address with the address of respective MAC 130, as directed by the commands.

Figure 3B:
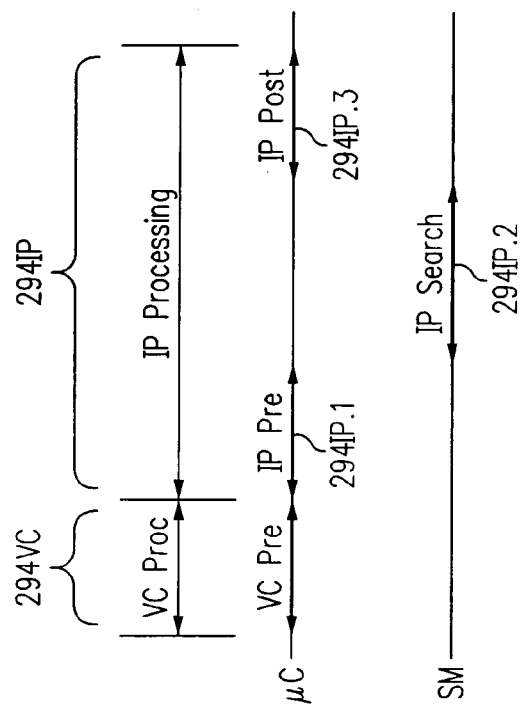

FIG. 3B illustrates processing performed by an egress task for a single frame. At stage 294VC, the task examines the VPI/VCI to determine if the frame is an applet. If so, the task loads the frame into the microcontroller program memory (shown at 314 in FIG. 5 described below) and executes the applet. Stage 294IP is skipped.

Alternatively, the VPI/VCI may indicate that the frame is an information request from ATM switch 120. Examples of such requests include a request to read a register in PIF 110, or to read statistics information. The egress task performs the request. If this is a request for information, the egress task writes one or more commands to ingress command FIFO 260I of the same hardware task that executes the egress task. These commands will cause the channel to send the information to the switch. Stage 294IP is skipped.

If the VPI/VCI does not indicate any management request (such as a request for information) from switch 120, stage 294IP is performed. At sub-stage 294IP.1, the task (i.e., the microcontroller) reads the IP destination address from the frame and supplies the address to the search machine. At stage 294IP.2, the search machine performs the search and returns the Ethernet destination address and, possibly, access control information. At stage 294IP.3, the task writes commands to its egress command FIFO 260E to replace the Ethernet destination address of the frame with the address provided by the search machine, to replace the Ethernet source address with the address of the respective MAC 130.x, and to transfer the frame to the MAC. Other kinds of processing may also be performed depending on the task software.

While the microcontroller waits for the search machine at stages 290DA.2, 290IP.2, 290ISA.2, 294IP.2, the microcontroller is available to execute another software task in the same or other hardware tasks.

In some embodiments, having a single task for each ingress flow and each egress flow does not fully load the microcontroller, and therefore more than one task for each half-duplex data flow are provided to enable the microcontroller to process more than one frame in each data flow in parallel. This is illustrated by the following considerations. The demands on the microcontroller speed are the greatest when the Ethernet frames are short, because the same processing of FIGS. 3A, 3B has to be performed both for short and long frames. The shortest Ethernet frame has 64 bytes. Suppose for example that the four Ethernet ports are 100 MB/sec ports and the ATM ports are 155 MB/sec. At 100 MB/sec, the shortest frame goes through the Ethernet port in 5.12 microseconds. Therefore, the microcontroller and the search machine have to process the frame in 5.12+1.6=6.72 microseconds (1.6 microseconds is the interframe gap).

Let us assume a microcontroller clock speed of 50 MHz. This is a fairly slow clock speed to ensure reliable operation. Higher speeds (for example, 100 MHz) are used in other embodiments. At 50 MHz, the 6.72 microseconds is 336 clock cycles. Therefore, the clock cycle budget for the ingress and egress tasks of a single hardware task is 336/4=84 clock cycles.

Since processing of a frame is divided between the microcontroller and the search machine, which do not necessarily work in parallel on the same frame, the processing latency for one ingress frame and one egress frame in the same hardware task is allowed to be greater than 84 cycles even in wire speed processing. If processing takes more than 84 cycles, and 64-byte frames arrive back to back on the ingress and egress sides, the next frame may start arriving before the previous frame in the same data flow has been processed. Therefore, it is desirable to allow the microcontroller to start processing the next frame before the processing of the previous frame in the same data flow is completed. To implement such parallel processing of multiple frames in the same data flow, more than one software task for each data flow is provided.

Thus, in some embodiments, each hardware task HTx includes two ingress tasks IGx.0, IGx.1 and two egress tasks EGx.0, EGx.1. For example, hardware task HT1 includes ingress tasks IG1.0, IG1.1 and egress tasks EG1.0, EG1.1. Each task is identified by a 4-bit task number including:

CHID—channel ID (2-bits)=0, 1, 2 or 3 for respective ports 0, 1, 2, 3;

SN—sequence number (0 for IGx.0, EGx.0; 1 for IGx.1, EGx.1);

I/E—0 for ingress; 1 for egress.

The total number of tasks is thus 16.

A frame is processed by a single task. If the frame is an applet, the applet is executed by the same task.

The microcontroller instruction execution is pipelined. Thus, Table 1 above indicates clock cycles in which a new instruction is started for the respective hardware task. For example, in cycle 1, instruction execution is started for hardware task HT0. The instruction execution continues in subsequent cycles.

Figure 4:
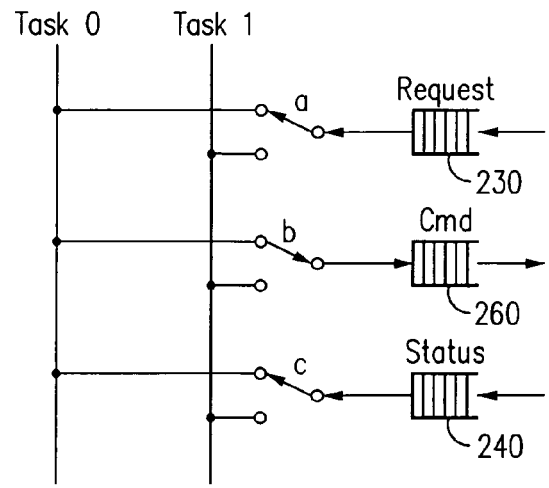
FIG. 4 is a logical diagram illustrating how different tasks access shared resources in the system of FIG. 1.

Task access to FIFOs 230, 240, 260 in each sub-channel is controlled as shown in the logic diagram of FIG. 4. In FIG. 4, "Task 0" and "Task 1" are the two tasks for the same sub-channel, for example, ingress tasks IG1.0, IG1.1 for sub-channel 150I of channel 150.1. At the beginning, only Task 0 has access to the sub-channel FIFOs 230, 240, 260. When Task 0 accesses the request FIFO 230, switch "a" is flipped to connect the request FIFO to Task 1. Task 0 will not be allowed to read the request FIFO again until Task 1 has read the request FIFO.

Switch "b" controls the task access to command FIFO 260. Switch "b" is flipped when all the commands for a frame have been written by Task 0.

Switch "c" which controls the task access to status FIFO 240 is flipped when the status FIFO has been read by Task 0.

To synchronize task access to the search machine, search machine 190 executes commands one after another providing results in the same order.

Selecting a task for execution takes only one clock cycle (pipeline stage TS in FIG. 6 described below) in each instruction. Further, the task selection is pipelined, and hence does not affect the throughput. The task selection is performed by hardware. No operating system is used in the microcontroller. Therefore, low latency is achieved.

At any time, each task is in one of the three states, Active, Ready, or Suspended. In the Active state, the task is being executed. At most four tasks (one for each hardware task) may be Active at the same time. Each Active task is scheduled for execution once every four clock cycles (see Table 1 above).

An Active task is transferred to the Suspended state if the task tries to access a resource that is unavailable. The resources are described in Addendum 2. When the resource becomes available, the task goes to the Ready state.

When an Active task is suspended, one of the tasks in the Ready state in the same channel is selected for execution by task control 320 (FIG. 5) and is transferred to the Active state.

Figure 5:
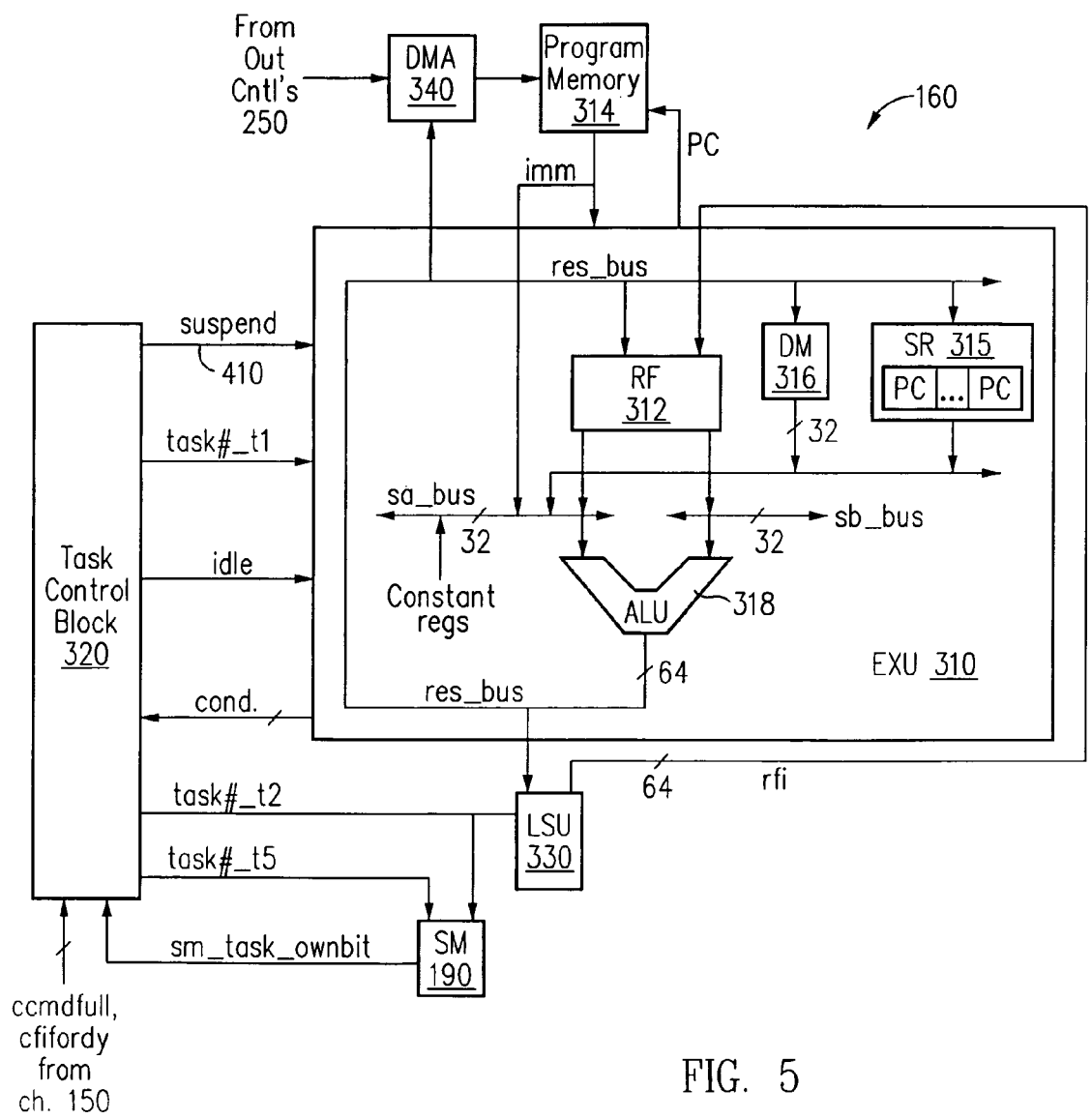
FIG. 5 is a block diagram of a processor used in the system of FIG. 1.

FIG. 5 is a block diagram of microcontroller 160. Execution unit 310 executes programs stored in program memory 314. Programs are downloaded from ROM 204 (FIG. 1) during boot. In addition, applets can be loaded and executed dynamically as described above. The applets can be discarded after being executed, or they can remain in memory 314.

Execution unit 310 includes a register file 312 having general purpose registers, a special registers block 315, and a data memory 316. Register file 312 includes two 32-bit outputs connected to respective buses sa_bus, sb_bus, which in turn are connected to inputs of ALU 318. 32-bit outputs of data memory 316 and special registers block 315 are connected to sa_bus. Separately connected to bus sa_bus are the outputs of special registers "null" and "one" (Table A6-1, Addendum 6) that store constant values (these registers are marked "Constant regs" in FIG. 5).

Bus sa_bus also receives the immediate field "imm" of an instruction read from program memory 314.

The 64-bit output of ALU 318 is connected 64-bit bus res_bus which is connected to inputs of register file 312, data memory 316, and special registers block 315.

Register file 312, data memory 316 and special registers 315 are described in Addendum 6. As described therein, the registers and the data memory are divided between tasks so that no save/restore operation is needed when tasks are rescheduled. In particular, special registers 315 include 16 PC (program counter) registers, one for each task.

Load/store unit (LSU) 330 provides an interface between execution unit 310, search machine 190, and internal memory 170. LSU 330 queues load and store requests to load a register from memory or to store register contents in memory. LSU 330 has an input connected to res_bus and also has a 64-bit output rfi connected to an input of register file 312.

DMA block 340 has an input connected to the bus res_bus to allow execution unit 310 to program DMA 340. DMA 340 can load applets into the program memory.

Figures 6, 7:
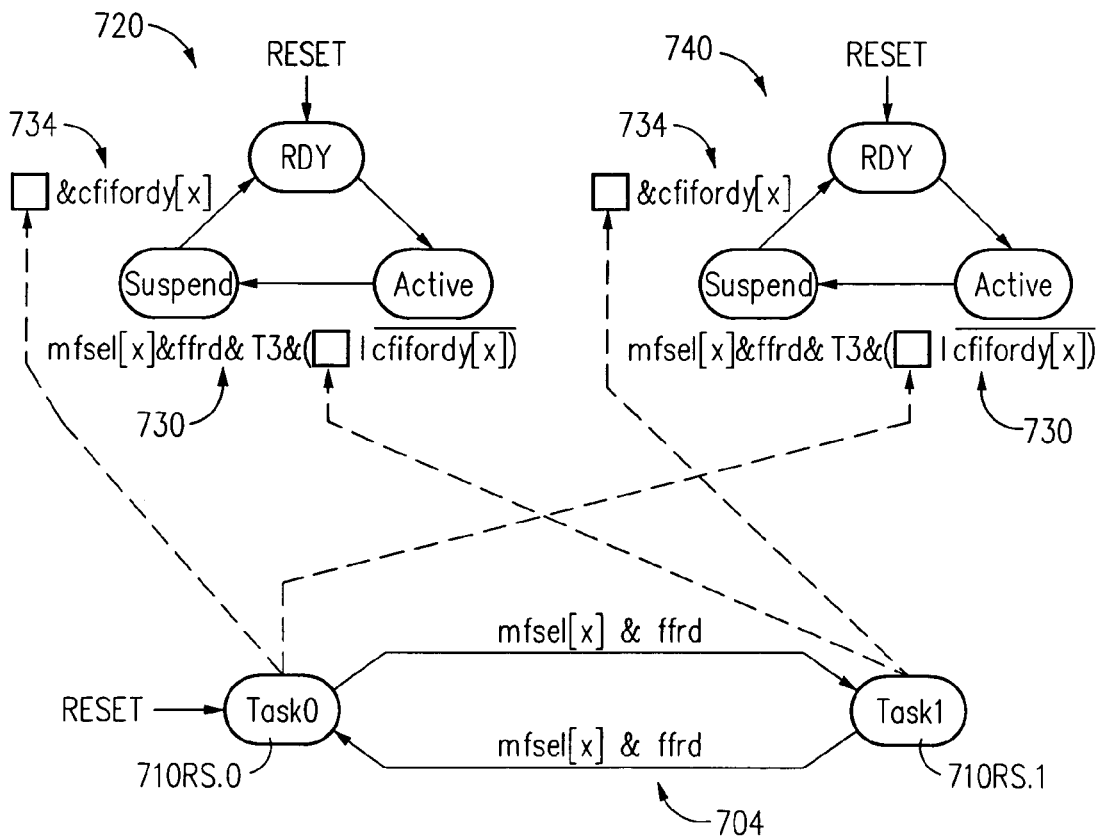
FIG. 6 illustrates an instruction execution pipeline of the processor of FIG. 5.
FIGS. 7–12 illustrate task and resource state transitions in the system of FIG. 1.

FIG. 6 illustrates the instruction execution pipeline. The pipeline has seven stages:

(1) Task Select (TS) stage t0. In this stage, an active task is selected for the respective channel 150.x by task control 320. In some embodiments, the task control block implements a fixed priority scheme: task IGx.0 has the highest priority, then IGx.1, then EGx.0, and then EGx.1.

In some embodiments, once a task is made active, it is not suspended simply because a higher priority task becomes ready to run. The lower priority task remains active until it tries to access an unavailable resource.

(2) During the Fetch (F) stage t1, task control block 320 drives the active task number signal task#_t1 (same as tsk_taskNumt1 in Table A1-1, Addendum 1) to execution unit 310. Signal task#_t1 selects one of the 16 PC values in special registers 315.

If no task is active, task control block 320 asserts the "idle" signal to execution unit 310. The signal is shown as "tsk_idle" in Table A1-1. When "idle" is asserted, task#_t1 is "don't care", and instruction execution unit 310 executes a NOP (no operation) instruction in the remaining pipeline stages.

If "idle" is deasserted, the PC register value selected by task#_t1 in special registers block 315 is provided to program memory 314. The instruction pointed to by the selected PC is read out from the memory to execution unit 310.

(3) During the Decode (D) stage t2, the instruction is decoded by the execution unit.

(4) During the Read (R) stage t3, the instruction operands are read from register file 312 and/or special registers 315 and/or data memory 316 and presented to ALU 318.

Also at this stage, task control 320 generates the Suspend signal (tsk_susp in Table A1-1) on lead 410 (FIG. 5) as described in more detail below in connection with FIGS. 7–13B. If the Suspend signal is asserted, the task is suspended, the instruction execution is aborted and the task's PC register is frozen. When a task is made Active later, the same instruction will be re-executed.

Also at this stage, execution unit 310 generates a Wait signal. If the Wait signal is asserted, the instruction execution is not completed and the PC register is frozen, but the task remains active, and the instruction will be executed again starting the next clock cycle. For example, if instruction 1 in FIG. 6 is delayed due to the Wait signal being asserted in cycle 3, the same instruction will be re-executed as instruction no. 5 starting in cycle 4.

The Wait signal is asserted when a condition blocking the instruction is likely to disappear by the time the same hardware task is scheduled again. The Wait conditions are described in Addendum 3.

If the Suspend and Wait signals are deasserted, the PC register is changed to point to the next instruction.

(5) During the Execution (E) stage t4, the instruction is executed.

(6) During the Write Back (WB) stage t5, the results of the execution stage are written to their destinations except if a destination is in register file 312.

(7) During the Write Registers (WR) stage, the results of the execution stage are written into the register file 312 if required.

Of note, the WR stage of each instruction (e.g. instruction 1, cycle 6) occurs before the R stage of the next instruction of the same hardware task (see instruction 5, cycle 7). Therefore, if, for example, instruction 5 uses the results of instruction 1, the results will be written to the register file or the special registers before the instruction 5 reads them in cycle 7.

As illustrated in FIG. 6, when an instruction is aborted (at the R stage), the pipeline does not have to be purged from other instructions that have already been started, because these instructions belong to other tasks (moreover, to other hardware tasks). For example, if instruction 1 has to be aborted, the only other instructions that have been started on or before the R stage of instruction 1 are instructions 2, 3 and 4. These instructions do not have to be purged because they are executed by other tasks.

For a given hardware task, switching between the corresponding four software tasks does not require execution of separate instructions as would be the case if task switching were performed by operating system software. High throughput is therefore achieved.

FIG. 7 is a bubble diagram illustration of task synchronization with respect to a single request FIFO 230 or status FIFO 240. In the bottom diagram 704, "Task 0" and "Task 1" have the same meaning as in FIG. 4. More particularly, these are the two software tasks sharing the request or status FIFO. In some embodiments, Task 0 is IGi.0 for the ingress sub-channel, or EGi.0 for the egress sub-channel.

Diagram 704 is a state machine illustrating the FIFO ownership. On RESET, the FIFO is owned by Task 0, as indicated by state 710RS.0.

When Task 0 has successfully read the FIFO, the FIFO becomes owned by Task 1, as indicated by state 710RS.1. Reading the FIFO is equivalent to flipping the "a" or "c" switch of FIG. 4. When Task 1 has successfully read the FIFO, the state machine returns to state 710RS.0.

The FIFO reading operation is indicated by condition mfsel[x] & ffrd. The signal mfsel is described in Addendum 4. The signal ffrd is asserted by the execution unit in stage t3 when any request or status FIFO is read by the microcontroller. A separate ffrd version is generated for each request and status FIFO. (If the FIFO read is successful, signal mfrd of Addendum 4 is asserted in stage t5.)

There are 16 request and status FIFOs. Each of these FIFOs is identified by a unique number "x" from 0 to 15. When the FIFO "x" is being read, the number "x" is driven on lines mfsel, as indicated by mfsel[x] in FIG. 7.

Diagrams 720 and 740 indicate how Tasks 0 and 1 change states with respect to the FIFO. As indicated above, each task has three states: Ready ("RDY"), Active and Suspended. On RESET, all the tasks become Ready. A task becomes Active if selected at pipeline stage t0.

In the embodiment being described, a task cannot go from the Active state to the Ready state directly, though this is possible in other embodiments.

In the embodiment being described, each task goes from the Active state to the Suspend state on a "Suspend" condition 730. A suspended task becomes Ready on a release condition 734. The possible suspend conditions are listed in Table A1-2 of Addendum 1. The release conditions are listed in Table A1-3.

In diagram 720, the suspend condition 730 occurs when Task 0 attempts to access the FIFO when the FIFO is not available. More particularly, the condition 730 is:

(1) the task is in pipeline stage t3 (indicated by signal "T3" generated by execution unit 310);

(2) ffrd is asserted indicating a FIFO read operation;

(3) mfsel identifies the FIFO "x"; and (4) either the FIFO is owned by Task 1 (state machine 704 is in state 710RS.1), or signal cfifordy[x] is low indicating that the FIFO "x" is empty. (Signal cfifordy is described in Addendum 4. This signal is sampled every fourth cycle and is valid when sampled.)

The fact that the FIFO is being read by Task 0 and not by any other task is established by Task 0 being in pipeline stage t3.

Condition 730 for Task 1 (diagram 740) is similar.

Conditions 730 in diagrams 720, 740 are shown in Table A1-2 (Addendum 1) separately for each type of task (ingress task 0, ingress task 1, egress task 0, egress task 1) and each type of FIFO (request and status). The request FIFO conditions are listed as conditions number 1 in each of the four sections "Ingress Task 0", "Ingress Task 1", "Egress Task 0", "Egress Task 1". Thus, for ingress task 0, the condition is:

exe_RfifoRd & mfsel[x] & (Ireqf1~cfifordy[x])

Signal exe_RfifoRd is the same as ffrd. Ireqf indicates that the FIFO is owned by Ingress Task 1. All the signals in Table A1-2 are sampled in stage t3, so "t3" is omitted from some of the conditions in the table. For egress task 0, signal Ereqf indicates the respective request FIFO is owned by egress tasks 1. Thus, Ereqf replaces Ireqf. Task control 320 generates a separate signal Ireqf or Ereqf for each request FIFO.

In Addendum 1, the signal negation is indicated by "~" before the signal name (as in ~cfifordy) or by the underscore following the signal name (as in Ereqf_ in condition 1 for egress task 1).

For the status FIFOs, the suspend conditions 730 are conditions numbered 2 in table A1-2. Signal exe_SfifoRd is the ffrd version for a status FIFO. The number identifying the status FIFO is shown as "y" rather than "x".

Release condition 734 in diagram 720 is: Task 0 owns the FIFO (state machine 704 is in state 710RS.0), and cfifordy [x] is high indicating that the FIFO is not empty. The release condition 734 for task 1 (diagram 740) is similar.

The release conditions are shown in Table A1-3 in Addendum 1. Each release condition corresponds to the suspend condition in the same slot in Table A1-2. For example, release condition 1 in section "Ingress Task 0" in Table A1-3 releases the task to the Ready state if the task was suspended by suspend condition 1 in section "Ingress Task 0" in Table A1-2. Thus, release conditions 1 and 2 in Table A1-3 correspond to the release conditions 734 in diagram 720 and 740 for the request and status FIFOs.

Figure 8:
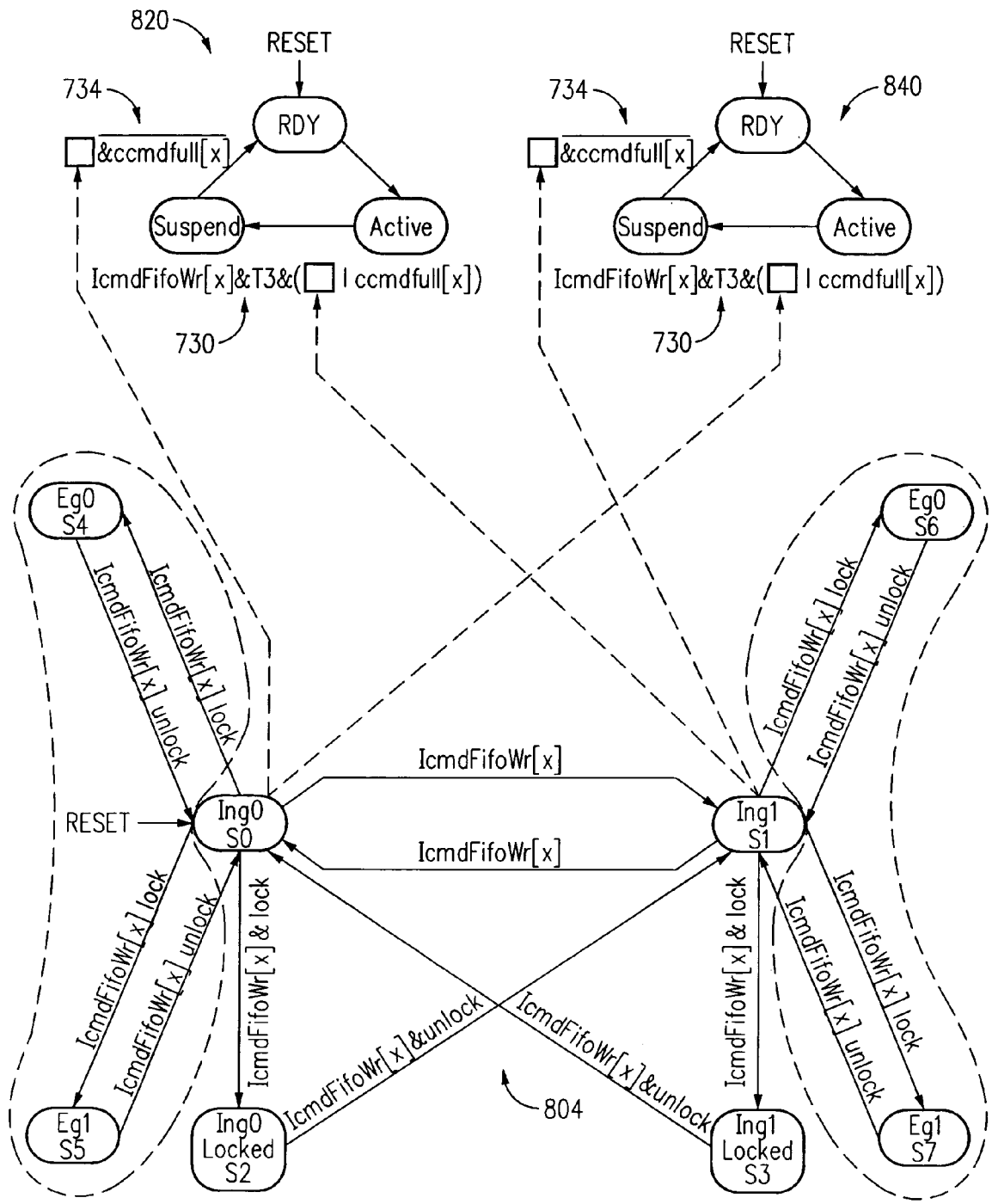

FIG. 8 illustrates task synchronization in an ingress sub-channel with respect to the sub-channel command FIFO 260 (i.e. 260I). Bottom diagram 804 illustrates the state machine for the ingress command FIFO. The FIFO can be owned both by the ingress and the egress tasks. On RESET, the state machine is in a state S0. In this state, the FIFO is owned by Ingress Task 0. When Ingress Task 0 writes to the FIFO a single word without locking the FIFO (flipping the switch "b" in FIG. 4), the FIFO moves to state S1 in which the FIFO is owned by Ingress Task 1. The writing operation is indicated by signal IcmdFifowr[x], where "x" identifies one of the four ingress and egress tasks that can write the ingress command FIFO. (If IcmdFifoWr[x] is asserted by the execution unit in stage t3, the corresponding mfload bit (Addendum 4) is asserted in stage t5.) Signal IcmdFifoWr[x] is asserted for an appropriate "x" whenever a respective task writes the FIFO.

The absence of locking is indicated by the "unlock" signal generated by execution unit 310 from the L flag of microcontroller instruction "CMD" (Addendum 7) used to write the command FIFOs.

When Ingress Task 1 writes a command FIFO (as indicated by IcmdFifoWr[x] where "x" indicates ingress Task 1) without locking the FIFO the state machine returns to state S0.

When Ingress Task 0 writes the FIFO in state S0 and the "lock" signal is asserted indicating that the FIFO is to be locked, the state machine moves to state S2. In that state, the FIFO is still owned by Ingress Task 0. The lock signal is generated by execution unit 310 from the L flag in microcontroller instruction CMD (Addendum 7). The FIFO remains in state S2 until ingress Task 0 writes the FIFO with the "unlock" signal asserted. At that time, the FIFO moves to state S1.

Similarly, if Ingress Task 1 writes the FIFO in state S1 with "lock" asserted, the FIFO moves to state S3. In that state the FIFO is still owned by Ingress Task 1. The FIFO remains in state S3 until Ingress Task 1 writes the FIFO with "unlock" asserted. At that time, the FIFO moves to state S0.

When the state machine is in state S0 or S1, and an egress task writes the command FIFO without locking the FIFO, no state transition occurs. When egress task 0 writes the FIFO with locking in state S0, the FIFO moves to state S4. In that state, the command FIFO is owned by Egress Task 0. The state machine remains in state S4 until Egress Task 0 writes the command FIFO with "unlock" asserted. At that point, the state machine returns to state S0.

State S5 is similar to S4, but describes Egress Task 1 writing and owning the command FIFO.

States S6 and S7 are similar to respective states S4 and S5, but states S6 and S7 are entered from state S1 rather than S0.

Diagrams 820 and 840 illustrate state transitions of respective Ingress Tasks 0 and 1 with respect to the command FIFO. The suspend conditions 730 are conditions number 3 in Table A1-2. Signal IcmdFifoWr[x] is the same as exe_IcmdFifoWr[x] in conditions 3 for ingress tasks 0 and 1. Signal task#_t3 in Table A1-2 is the same as "T3" in diagrams 820 and 840. Signal ccmdfull[x] is a signal that the command FIFO "x" is full (see Addendum 4). This signal is valid in stage t3. Signal IcmdfOwnedByI0 indicates that the command FIFO is owned by ingress task 0 (that is, state machine 804 is in state S0 or S2). Signal IcmdfOwnedByI1 indicates that the command FIFO is owned by ingress task 1 (states S1, S3 in diagram 804).

For the egress tasks, the suspend conditions caused by writing to the ingress command FIFOs are conditions 8 in Table A1-2. Signal IcmdfOwnedByE0 indicates that the command FIFO is owned by egress task 0 (states S4, S6 in diagram 804). Signal IcmdfOwnedByE1 indicates that the command FIFO is owned by egress task 1 (states S5, S3 in diagram 804).

The release conditions 734 (FIG. 8) are conditions 3 for the ingress tasks in Table A1-3.

The egress task synchronization with respect to the egress command FIFOs is similar. For the egress FIFOs, states S4, S5, S6, S7 are absent. In Tables A1-2 and A1-3, the pertinent conditions are conditions number 3. Signal exe_EcmdFifoWr replaces exe_IcmdFifoWr to indicate a write operation to the egress FIFO. Signal Ecmdf1 indicates that the FIFO is owned by egress task 1.

Figure 9:
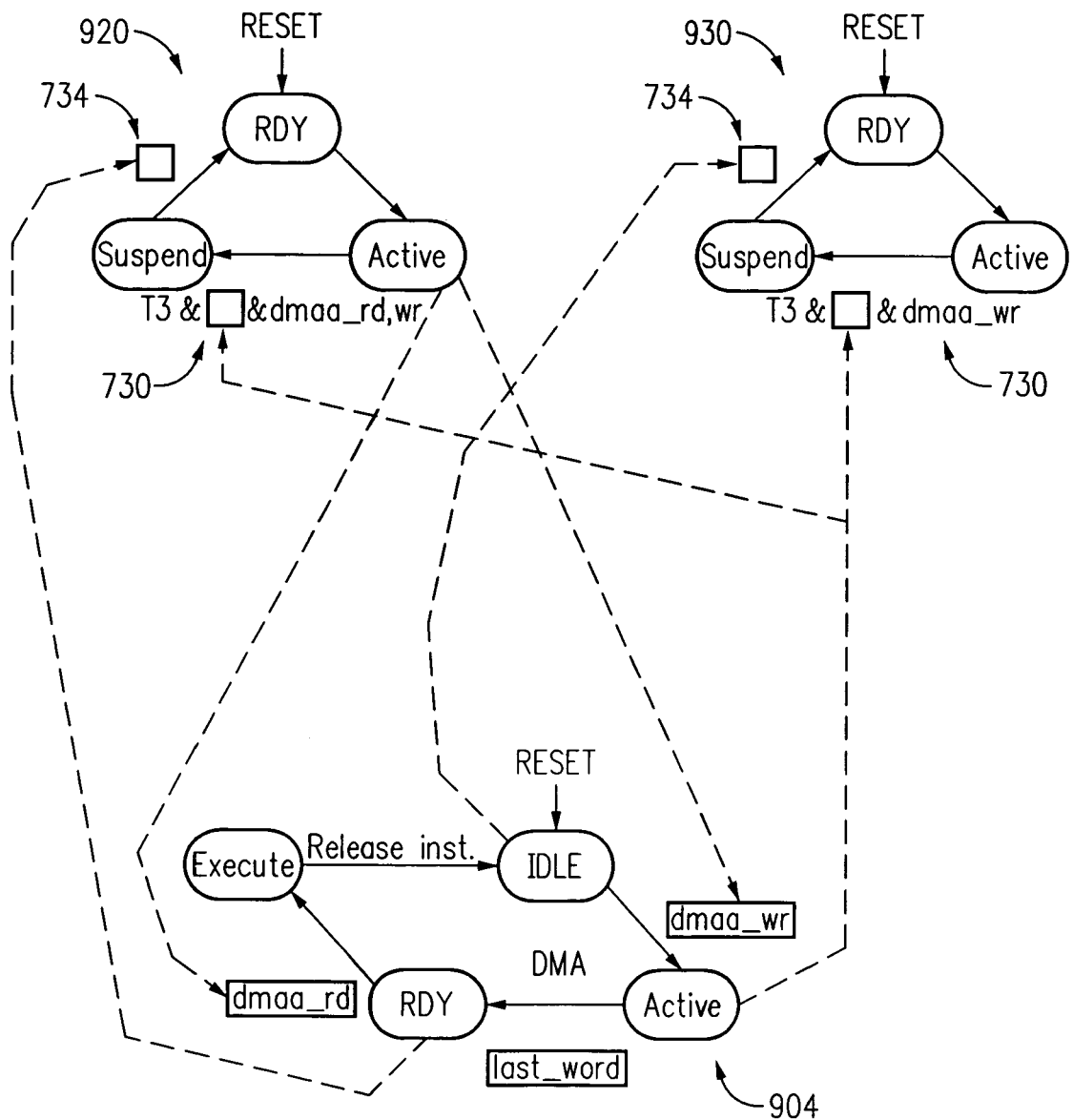

FIG. 9 illustrates egress task synchronization with respect to the DMA resource. The bottom diagram 904 illustrates the DMA state machine. On RESET, the DMA is IDLE. When an egress task writes a DMA address (DMA transfer destination address in program memory 314) to the DMA address register DMAA (Addendum 6) of DMA 340 (FIG. 5), as indicated by "dmaa_wr" in FIG. 9, the task becomes the DMA owner, and the DMA 340 becomes active and starts the DMA transfer from internal memory 170. In the example of FIG. 9, the DMA owner is an Egress Task 0.

When the transfer has been completed, as indicated by "last_word" in FIG. 9, the DMA becomes ready ("RDY").

When the DMA is in the Ready state, and the DMA owner task reads the DMA address register (indicated by "dmaa_rd" in FIG. 9), the DMA moves to the Execute state. The DMA owner is allowed to read the address register only in the DMA Ready state. Non-owner tasks are allowed to read the DMA address register in any DMA state.

When the DMA is in the Execute state, the DMA owner task executes the applet loaded by the DMA. No new DMA access is allowed.

When the DMA owner task writes the release code 111 into the OP field of the DMAA register (Addendum 1), the DMA returns to the Idle state.

Diagrams 920, 930 illustrate state transitions for two egress tasks Task 0, Task N, not necessarily in the same hardware task. The conditions 730 are conditions 7 for the egress tasks in Table A1-2. In the table, exe_dmaaRd is the same as dmaa_rd in FIG. 9; exe_dmaaWr is the same as dmaa_wr. "dmaa_rd,wr" in FIG. 9 means "dmaa_rd OR dmaa_wr". Signals exe_dmaaRd, exe_dmaaWr are generated by execution unit 310.

Thus, the DMA owner task is suspended when it attempts either to read or write the DMA address register in stage t3 while the DMA is Active. The owner task is released when the DMA becomes Ready. The non-owner task is suspended when it attempts to write the DMA register in stage t3 while the DMA is Ready. The non-owner task is released when the DMA becomes Idle.

The release conditions 734 are indicated as "clast_word" in conditions 7 for egress tasks 0 and 1 in Table A1-2.

Figure 10:
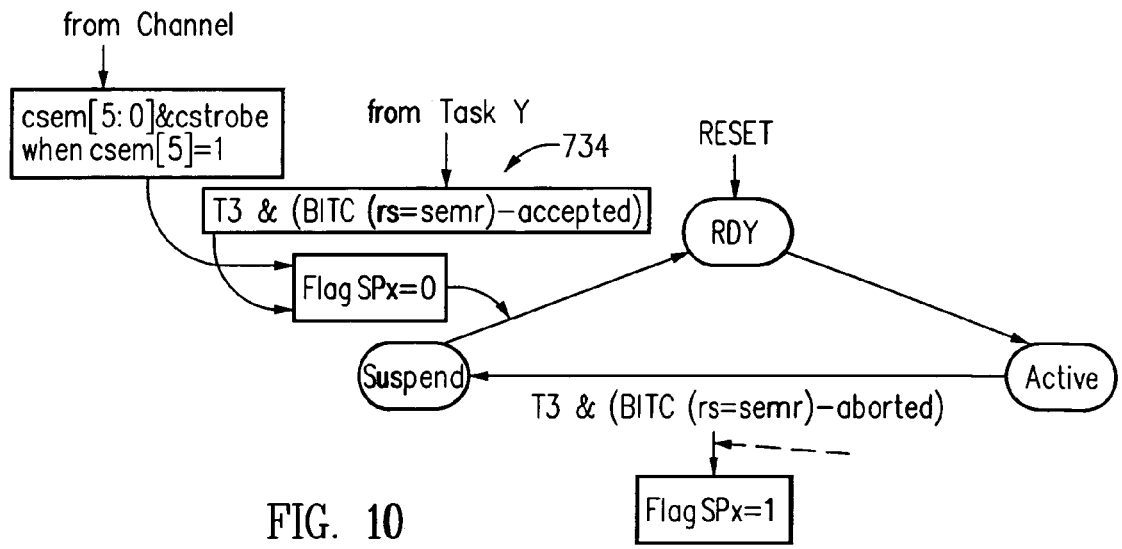

FIG. 10 illustrates task synchronization with respect to a semaphore register semr (Appendices 2, 6). The suspend conditions 730 are shown as conditions 5 in Table A1-2. Each suspend condition is as follows: (1) the task is in pipeline stage t3, and (2) a BITC or BITCI instruction is executed by the task with the target operand being the semaphore register, and the instruction has to be aborted because it is trying to write the same value to the semaphore register bit as the value the bit has had since before the instruction (this is indicated by signal exe_bitcSemReg in Table A1-2; all the signal names starting with "exe_" denote signals generated by execution unit 310). When the suspend occurs, task control block 320 sets a flag SPx to 1 where "x" is the task number (0–15).

The release condition 730 is that the flag SPx is cleared (i.e. set to 0). The task control block 320 clears all the flags SPx when any one of the following two conditions occurs:

(1) in pipeline stage t3, an instruction BITC or BITCI is executed successfully by some other Task Y. This condition is indicated by signal exe_bitcSemAcc in release conditions 5 in Table A1-3.

(2) The channel 150 writes the semaphore register. This is indicated by cstrobe being asserted (Table A4-1 in Addendum 4) and csem[5] being at 1. The channel accesses the semaphore register to send an indication to microcontroller 160 when commanded by a channel command. See the aforementioned U.S. patent application Ser. No. 09/055,044 "Systems and Methods for Data Transformation and Transfer in Networks" incorporated herein by reference.

Figure 11:
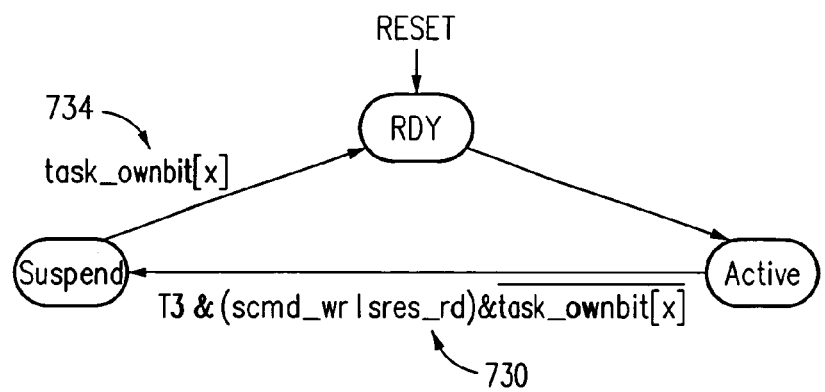

FIG. 11 illustrates task state transitions with respect to the search machine 190. Suspend condition 730 (conditions 4 in Table A1-2) is that both of the following conditions (1) and (2) are true:

(1) the task is in pipeline stage T3, the task is executing an instruction writing a command to the search machine (signal scmd_wr, shown as exe_scmdwr in Table A1-2) or reading a result from the search machine (signal sres_rd, shown as exe_scmdRd in Table A1-2). See microcontroller instruction SMWR (search machine command write) in Addendum 7 and the description of registers scmd, scmde in Addendum 6.

(2) the search machine resources are not available to the task, as indicated by the signal task_ownbit[x] being 0 ("x" is the task number). This signal is shown as sm_task_ownbit in Tables A1-1 and A1-2 in Addendum 1. The signals whose names start with "sm_" are generated by search machine 190. The search machine resources and suspend conditions are described in Addendum 2.

The release condition 734 is: the respective task_ownbit [x] is 1.

Figure 12:
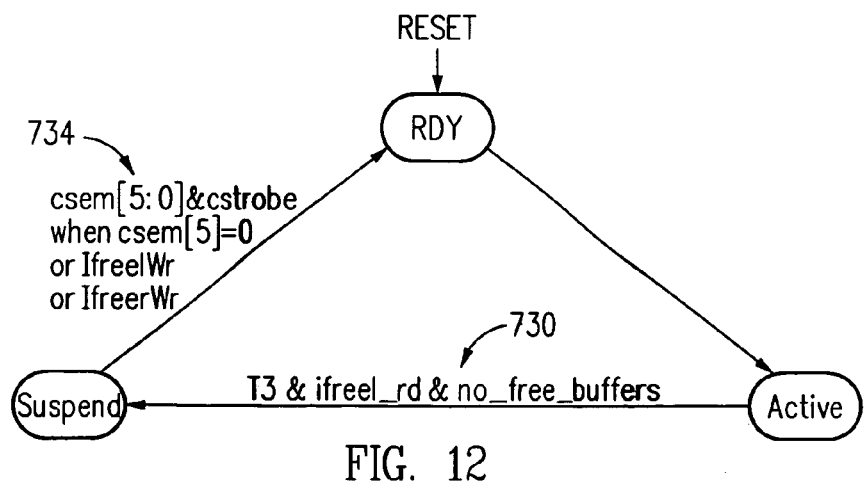

FIG. 12 illustrates task synchronization with respect to the free list of scratch buffers 1610 (FIG. 16 and Addendum 5) in memory 170. The suspend condition 730 (conditions 6 in Table A1-2) is that all of the following are true:

(1) The task is in pipeline stage t3;

(2) The task is reading the internal free list register IFREEL (Addendum 6), as indicated by signal ifreel_rd generated by the execution unit. This signal is shown as exu_ifreelRd in Table A1-2. The IFREEL register is read to get a free buffer number.

(3) The "no_free_buffers" ("no_free_buf") signal is asserted by the special registers block 315 to indicate no free buffers.

The release condition 734 is that either of the following three conditions becomes true:

(1) cstrobe (Table A4-1 in Addendum 4) is asserted by channel 150 while and csem[5] is 0, indicating that the channel 150 is returning the scratch buffer 1610 identified by signals csem[4:0] to the internal free list;

(2) signal IfreelWr (exu_ifreelwr in Table A1-3) is asserted by the execution unit, indicating that the microcontroller is writing to the IFREEL register (Addendum 6); this register is written with a number of a scratch buffer being freed;

(3) signal IfreerWr (exu_ifreerWr) is asserted by the execution unit, indicating that the microcontroller is writing to the IFREER register.

Figure 13A:
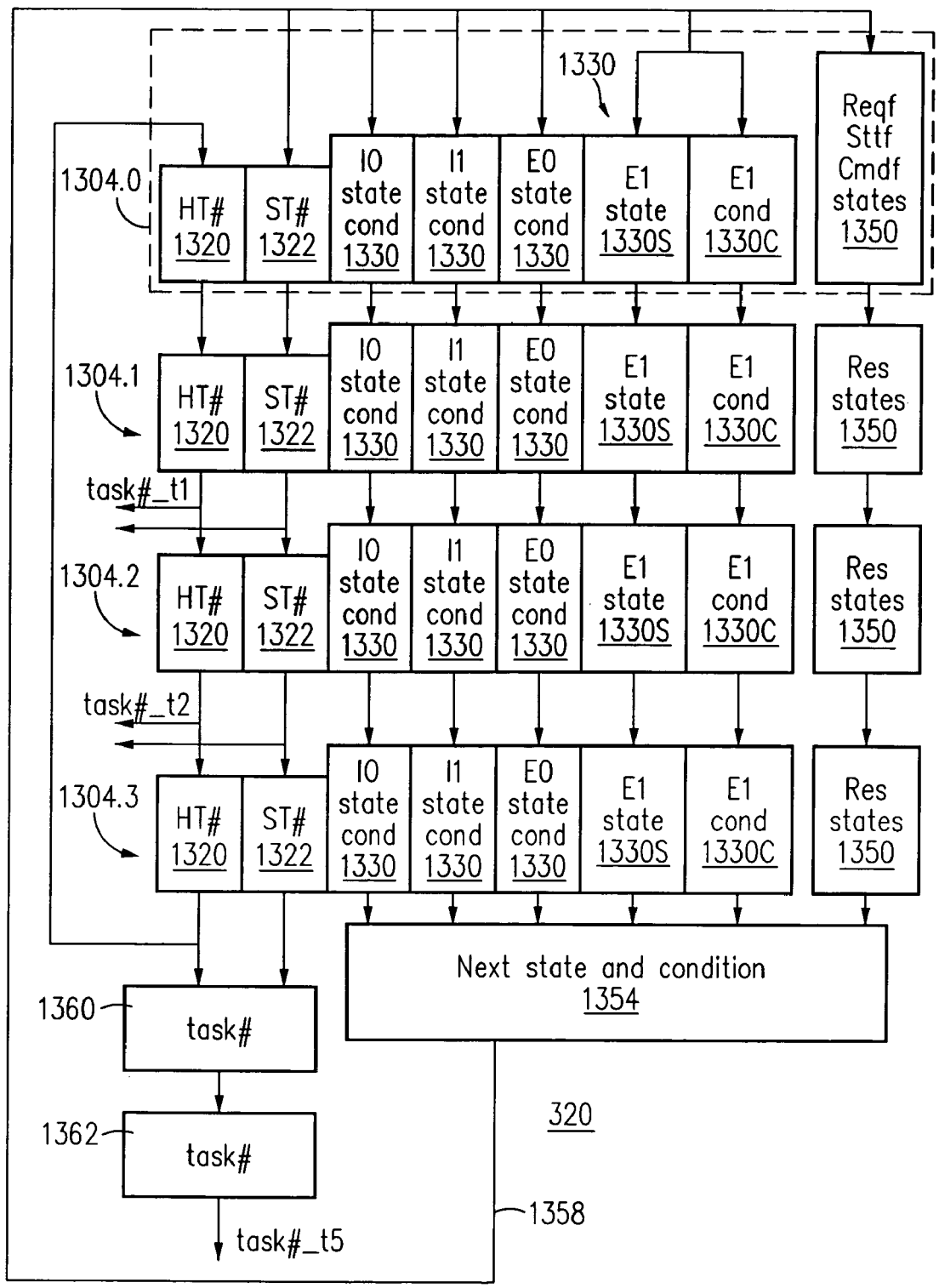
FIGS. 13A, 13B are block diagrams of task control block circuitry of the processor of FIG. 5.

FIG. 13A is a block diagram of task control block 320. Task control 320 includes four identical blocks of latches 1304.0, 1304.1, 1304.2, 1304.3. Latches 1304.0 store the information related to a hardware task in pipeline stage t0 (TS). That information is provided to the inputs of latches 1304.1. Latches 1304.1 store information on the hardware task in pipeline stage t1. Similarly, latches 1304.2, 1304.3 store information on hardware tasks in respective stages t2, t3. The outputs of latches 1304.1 are connected to respective inputs of latches 1304.2. The outputs of latches 1304.2 are connected to respective inputs of latches 1304.3. The outputs of latches 1304.3 are used to determine whether the software task in pipeline stage t3 should be suspended, and are also used to determine the states of the software tasks for the respective hardware tasks, as described below.

All the latches are clocked by the same clock (not shown).

In each block 1304, latch 1320 stores the respective hardware task number HT# (same as CHID above). Latch 1322 stores the active software task number ST#=<SN, I/E> for the hardware task. If no task is active for the hardware task, the output of latch 1322 is "don't care."

Thus, the outputs of latches 1320, 1322 of block 1304.1 form the signal task#_t1 (FIG. 5), and the outputs of latches 1320, 1322 of block 1304.2 form the signal task#_t2. The outputs of latches 1320, 1322 of block 1304.3 are connected to the inputs of latch circuit 1360, whose output is connected to the input of latch circuit 1362. The output of circuit 1362 provides the signal task#_t5 (FIG. 5).

The output of latch 1320 of block 1304.3 is connected to the input of latch 1320 of block 1304.0.

Each block 1304 contains four latch circuits 1330, one for each of the four software tasks IGx.0 (also shown as "I0" in FIG. 13A), IGx.1 ("I1"), EGx.0 ("E0"), and EGx.1 ("E1"), wherein "x" is the hardware task number stored in respective latch 1320. Each latch circuit 1330 includes two latches 1330S, 1330C, shown for simplicity only for task E1. Circuit 1330S stores the task's state (i.e., Ready, Active or Suspended). Circuit 1330C stores the release condition 734 needed to transfer the task to the ready state. The release condition is stored in the form of an index from 1 to 7 (as in Table A1-3), or from 0 to 6. The indices of possible release conditions for each type of task (I0, I1, E0, E1) are shown in the left column in Table A1-3 in Addendum 1.

The information in latch 1330C is meaningful only if the state stored in the respective latch 1330S is "Suspended". For the ready and active states, the information in latch 1330C is "don't care".

Each block 1304 includes six latches 1350 which store the states of the six respective request, status and command FIFOs for the corresponding hardware task. Possible states are illustrated in diagrams 704 (FIG. 7) and 804 (FIG. 8) and described above.

The outputs of latch circuits 1330, 1350 of block 1304.3 are connected to next state and condition generator 1354. Circuit 1354 generates the next states of tasks and request, status and command FIFOs and also next release condition values. These state and condition signals are provided via bus 1358 to the inputs of circuits 1330, 1350 of block 1304.0.

Figure 13B:
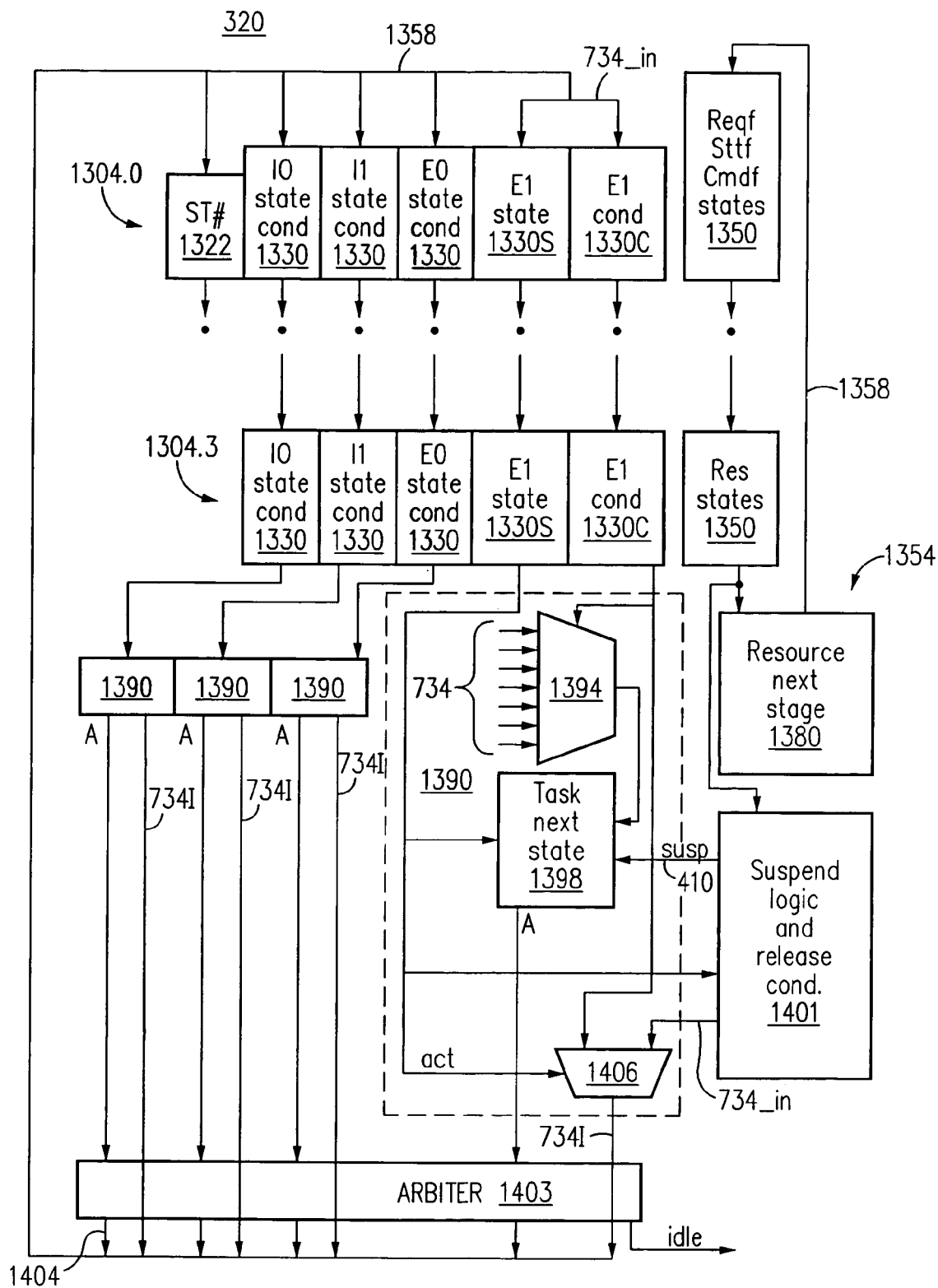

FIG. 13B shows the circuit 1354 in more detail. In circuit 1354, resource next stage generator 1380 receives the request, status and command FIFO states from latch circuit 1350 of block 1304.3. Generator 1380 also receives all the signals described above in connection with diagrams 704 and 804 which can cause state transition of any one of the resource, status and command FIFOs. Generator 1380 calculates the next states of the FIFOs in accordance with diagrams 704 and 804, and provides the next states to latch circuit 1350 of latch block 1304.0 in the same clock cycle t3.

The output of each latch circuit 1330 is connected to the input of respective circuit 1390. For simplicity, only the circuit 1390 for task E1 is illustrated in detail. For task E1, the release condition output of latch 1330C is connected to the select input of a multiplexer 1394. The data inputs of multiplexer 1394 receive the seven possible release conditions 734 for task E1 (Table A1-3 section "Egress Task 1"). Each data input to multiplexer 1394 is a one-bit signal asserted if the corresponding release condition is true, and deasserted if the condition is false.

The release condition signal selected by multiplexer 1394 (that is, the signal corresponding to the release condition stored in latch 1330C of block 1304.3) is provided to task next stage generator 1398. Generator 1398 also receives the task's current state from latch 1330S and the Suspend signal on lead 410 from suspend logic and release condition generator 1401 described below. Task next stage generator 1398 generates a signal A indicating whether the task remains suspended or, alternatively, whether the task can be made active in the same clock cycle. Signal A is generated according to the following table 2:

TABLE 2

| State from latch 1330S | Release cond. from MUX 1394 | Suspend signal on lead 410 | A |
|---|---|---|---|
| Suspended | TRUE | don't care | Ready |
|  | FALSE | don't care | Suspended |
| Ready | don't care | don't care | Ready |
| Active | don't care | TRUE | Suspended |
|  |  | FALSE | Active |

Arbiter 1403 receives the A outputs from the four circuits 1390 and generates from them the following signals on bus 1358: (1) the next stage of each task for respective latches 1330S of block 1304.0; and (2) the active software task number ST# on lead 1404. The software task number is delivered to latch 1322 of block 1304.0.

Arbiter 1403 also generates the signal "idle" which is asserted to indicate that no task is active (see also FIG. 5).

Each circuit 1390 for tasks I0, I1, E0 includes the signal A generation logic identical to multiplexer 1394 and task next state generator 1398 for task E1, except that the release condition inputs to the multiplexers are taken from the sections of Table A1-3 which correspond to the respective tasks (Ingress Task 0, Ingress Task 1, or Egress Task 0).

Suspend logic and release condition generator 1401 receives the outputs of latch circuits 1350 of block 1304.3 and also receives all the signals (e.g. cfifordy, mfsel, etc.) needed to calculate the suspend conditions 730 (FIGS. 7–12 and Table A1-2 of Addendum 1). Block 1401 calculates the suspend conditions for an active task identified by the output of latch 1322 of block 1304.3. Suspend logic 1401 provides the suspend signal on lead 410 to task next state generator 1398 and to similar generators in the other three circuits 1390.

In addition, suspend logic 1401 generates the release condition data inputs 734 for each multiplexer 1394 and similar multiplexers (not shown) in the other 3 blocks 1390. The release conditions are generated according to the formulas of Table A1-3.

Further, suspend logic 1401 receives the state outputs of all the state latches 1330S in block 1304.3. For each task, if: (1) the state output indicates the active state, and (2) one of the suspend conditions for the task is TRUE, suspend logic 1401 generates the index 734_in of the release condition needed to make the task ready. A separate index 734_in is generated for each task according to the respective section in Table A1-3. FIG. 13B shows the index 734_in for task E1 only.

In all the other cases (that is, if the state output for the task is not "active" or the state output is active but no suspend condition for the task is TRUE), the release index 734_in for the task is "don't care".

The release index 734_in for task E1 is provided to a data input of multiplexer 1406. The other data input of the multiplexer receives the condition output from latch 1330C of block 1304.3 for task E1. The select input receives the "act" bit from state output of latch 1330S of block 1304.3 for task E1. The state output has two bits. The bit "act" is one of the two bits. The bit "act" indicates whether the state is "active". If "act" indicates the active state, multiplexer 1406 selects the release index 734_in. If "act" indicates a non-active state, multiplexer 1406 selects the output of condition latch 1330C. The selected signal is provided to bus 1358 which supplies the signal to latch 1330C for task E1 in block 1304.0.

Similarly, each circuit 1390 for each task includes a similar multiplexer 1406 (not shown) which selects: (1) the release condition index 734_in for the respective task from suspend logic 1401 if the output "act" from the latch circuit 1330 of block 304.3 for the respective task indicates an active state, and (2) the condition output of latch 1330 of block 1304.3 for the respective task if "act" indicates a non-active state. The selected condition index is provided to the input of the respective latch 1330 in block 1304.0.

In some embodiments, when one task is suspended, the registers having task-specific values are not saved. In particular, each task has its own PC register having the task PC and flags (see Addendum 6). Further, register file 312 is divided into eight banks. Each bank is dedicated to a pair of an ingress task and an egress task from the same channel. The software executed by the task pair is written so that there are no common registers between the pair. Hence, while the register file registers may store task-specific values, these registers do not have to be saved or restored.

The embodiments described herein do not limit the invention. In particular, the invention is not limited by the number of ports, or by ports being full- or half-duplex, or by any timing, signals, commands or instructions. In some embodiments, the microcontroller comprises multiple execution units having the pipeline of FIG. 6 or some other pipeline. In some embodiments, one or more microcontrollers comprise multiple execution units such as present in a super scaler or VLIW (very large instruction word) processor. In some embodiments, the microcontroller is replaced by a processor implemented with multiple integrated circuits. The term "task" as used herein includes processes and threads. Other embodiments and variations are within the scope of the invention, as described by the appended claims.

Addendum 1

TABLE A1-1

TASK CONTROL BLOCK
Task Control Block signal list

| No. | Signal Name | Width | I/O | Timing | Function |
|---|---|---|---|---|---|
| | SM 190 Interface | | | | |
| 1. | tsk_taskNumt2 [3:0] | 4 | O | t2 | Task number during Decode Stage |
| 2. | tsk_taskNumt5 [3:0] | 4 | O | t5 | Task number during WB Stage |
| 3. | sm_task_ownbit [15:0] | 16 | I | async | Task Own bit (1- resource available) |
| | Channel 150 Interface | | | | |
| 4. | ccmdfull[7:0] | 8 | I | async | Command FIFO Full |
| 5. | cfifordy[15:0] | 16 | I | async | Req/Stt FIFO Ready |
| | Execution Unit Interface | | | | |
| 6. | tsk_susp | 1 | O | t4 | Suspend indication |
| 7. | tsk_taskNumt1 [3:0] | 4 | O | t0 | Task Number |
| 8. | tsk_idle | 1 | O | t0 | Indication to inject NOP during Fetch |
| 9. | exu_RfifoRd | 1 | I | t3 | Req FIFO read |
| 10. | exu_SfifoRd | 1 | I | t3 | Stt FIFO read |
| 11. | exu_scmdRd | 1 | I | t3 | SM Result Read |
| 12. | exu_scmdWr | 1 | I | t3 | SM Command write |
| 13. | exu_IcmdFifoWr | 1 | I | t3 | Ingress Command FIFO write |
| 14. | exu_EcmdFifoWr | 1 | I | t3 | Egress Command FIFO write |
| 15. | exu_lock | 1 | I | t3 | Command FIFO lock indication |
| 16. | edma_done | 1 | I | async | DMA done indication |
| 17. | edma_busy | 1 | I | async | DMA Busy indication |
| 18. | edma_suspend | 1 | I | t3 | DMA suspend |
| 19. | edma_sel | 1 | I | t3 | DMA release select |
| 20. | efs_flRelease | 1 | I | async | Free List Release Flag |
| 21. | efs_semRelease | 1 | I | async | Semaphore Release Flag |
| 22. | efs_suspend | 1 | I | t3 | Semaphore or Free List suspend |
| 23. | efs_sel | 1 | I | t3 | Semaphore or Free List rel. select |
| 24. | tsk_init_doneE0 | 1 | I | async | E0 Task Init |
| 25. | tsk_init_doneI0I1E1 | 1 | I | async | I0, I1, E1 Task Init |
| | LSU Interface | | | | |
| 26. | ts_taskNum2 | 4 | O | t2 | Task number during Decode Stage |

TABLE A1-2

Task Suspend Conditions

| num | Suspend Conditions |
|---|---|
| | Ingress Task 0 |
| 1 | exe_RfifoRd & mfsel[x] & (Ireqf \| ~cififordy[x]) |
| 2 | exe_SfifoRd & mfsel[y] & (Isttf \| ~cfifordy[y]) |
| 3 | exe_IcmdFifoWr[x] & task#_t3 & (ccmdfull[x] \| ~ICmdOwnedByI0) |
| 4 | (exe_scmdRd \| exe_scmdWr) & task#_t3 & ~sm_task_ownbit[x] |
| 5 | exe_bitcSemRej & task#_t3 |
| 6 | exu_ifreelRd & no_free_buf |
| | Ingress Task 1 |
| 1 | exe_RfifoRd & mfsel[x] & (~Ireqf \| ~cfifordy[x]) |
| 2 | exe_SfifoRd & mfsel[y] & (~Isttf \| ~cfifordy[y]) |
| 3 | exe_IcmdFifoWr[x] & task#_t3 & (ccmfull[x] \| ~ICmdOwnedByI1) |
| 4 | (exe_scmdRd \| exe_scmdWr0 & task#_t3 & ~sm_task_ownbit[x] |
| 5 | exe_bitcSemRej & task#_t3 |
| 6 | exu_ifreelRd & no_free_buf |
| | Egress Task 0 |
| 1 | exe_RfifoRd & mfsel[x] & (Ereqf \| ~cfifordy[x]) |
| 2 | exe_SfifoRd & mfsel[y] & (Esttf \| ~cfifordy[y]) |
| 3 | exe_EcmdFifoWr[x] & task#_t3 & (ccmdfull[x] \| ECmdf1) |
| 4 | (exe_scmdRd \| exe_scmdWr) & task#_t3 & ~sm_task_ownbit[x] |
| 5 | exe_bitcSemRej & task#_t3 |
| 6 | exu_ifreelRd & no_free_buf |
| 7 | (exe_dmaaRd \| exe_dmaaWr) & task#_t3 & ~dma_idle |
| 8 | exe_IcmdFifoWr[x] & task#_t3 & (ccmfull[x] \| ~ICmdOwnedByE0) |
| | Egress Task 1 |
| 1 | exe_RfifoRd & mfsel[x] & (Ereqf_ \| ~cfifordy[x]) |
| 2 | exe_SFifoRd & mfsel[y] & (Esttf_ \| ~cfifordy[y]) |
| 3 | exe_EcmdFifoWr[x] & task#_t3 & (ccmdfull[x] \| ~ECmdf1) |
| 4 | (exe_scmdRd \| exe_scmdWr) & task#_t3 & ~sm_task_ownbit[x] |
| 5 | exe_bitcSemRej & task#_t3 |
| 6 | exu_ifreelRd & no_free_buf |
| 7 | (exe_dmaaRd \| exe_dmaaWr) & task#_t3 & ~dma_idle |
| 8 | exe_IcmdFifoWr[x] & task#_t3 & (ccmfull[x] \| ~ICmdOwnedByE1) |

TABLE A1-3

Task Release Conditions

| num | Release Conditions |
|---|---|
| | Ingress Task 0 |
| 1 | Ireqf_ & cfifordy[x] |
| 2 | Isttf_ & cfifordy[y] |
| 3 | ccmdfull[x]_ & ICmdOwnedByI0 |
| 4 | sm_task_ownbit[x] |
| 5 | SPx & (exe_bitcSemAcc \| (cstrobe & csem[5])) |
| 6 | exu_ifreelWr \| exu_ifreerWr \| (cstrobe & ~csem[5]) |
| | Ingress Task 1 |
| 1 | Ireqf & cfifordy[x] |
| 2 | Isttf & cfifordy[y] |
| 3 | ccmdfull[x]_ & ICmdOwnedByI1 |
| 4 | sm_task_ownbit[x] |
| 5 | SPx & (exe_bitcSemAcc \| (cstrobe & ~csem[5])) |
| 6 | exu_ifree1Wr \| exu_ifreerWr \| (cstrobe & -csem[5]) |
| | Egress Task 0 |
| 1 | Ereqf_ & cfifordy[x] |
| 2 | Esttf_ & cfifordy[y] |
| 3 | ccmdfull[x]_ & ~ECmdf1 |
| 4 | sm_task_ownbit[x] |
| 5 | SPx & (exe_bitcSemAcc \| (cstrobe & csem[5])) |
| 6 | exu_ifreelWr \| exu_ifreerWr \| (cstrobe & ~csem[5]) |
| 7 | clast_word |
| 8 | ccmdfull[x]_ & ICmdOwnedByE0 |
| | Egress Task 1 |
| 1 | Ereqf & cfifordy[x] |
| 2 | Esttf & cfifordy[y] |
| 3 | ccmfull[x]_ & ECmdf1 |
| 4 | sm_task_ownbit[x] |
| 5 | SPx & (exe_bitcSemAcc \| (cstrobe & csem[5])) |
| 6 | exu_ifreelWr \| exu_ifreerWr \| (cstrobe & ~csem[5]) |
| 7 | clast_word |
| 8 | ccmdfull[x]_ & ICmdOwnedByE1 |

Addendum 2

Resources

All resources are accessed through special registers or dedicated microcontroller commands.

Search Machine

The Search Machine has two resources: Command, written by the microcontroller, and Result.

There are 16 write only Command resources (one for every task). The only case when this resource is not available is when a previous command from the same task is not completed.

There are 16 read only Result resources (one for each task). When a command is posted to the Search Machine, the Result becomes unavailable until the command is executed. Some commands (e.g. Insert or Delete) do not have a result.

Channel Control

The channel control has three kinds of resources: command FIFOs 260, request FIFOs 230, and status FIFOs 240.

A command resource is unavailable in two cases:

a. The resource belongs to another task. In this case when the other task releases the resource, it becomes available to this task.

b. Command FIFO is full. In this case when the Command FIFO becomes not full, the task can continue to use this resource.

The Command resource has session protection (i.e. several commands can be written by one task before the resource is passed to another task). This is achieved by locking the resource during the first access and unlocking it in the last access. When the Command resource is locked, no other task can access this resource.

An egress task EGx of a channel 150.x may write commands to an ingress command FIFO 260I of the same channel 150.x to send a message to switch 120. The egress task may write the ingress command FIFO whenever the ingress command FIFO is unlocked. When the egress task writes its first command to the ingress command FIFO 260I, the command FIFO becomes locked until the last command from the egress task has been written.

A Request or Status FIFO resource is not available in two cases:
   a. The resource belongs to another task. In this case when the other task reads the FIFO, the resource becomes available to this task.
   b. The FIFO is empty. In this case when the FIFO becomes ready, the task can continue to use this resource.

DMA

The DMA block is responsible for downloading applets from data FIFOs to the program memory 314. This resource is used by egress tasks which set the DMA address before the transfer and read the last word address when the transfer is complete. Reading the last word address during the transfer will cause the task to be suspended until the last word is transferred. Also, an attempt to write a new DMA address by another egress task, when the first transfer is not complete, will cause the task suspension.

Internal Memory 170 Management

The Internal Memory Management is responsible for managing free buffers 1610 (FIG. 15) inside the Scratch Pad Area in the internal memory. There are 32 free buffers in the memory. When a task wants to get the next available free buffer, it accesses the Free List (FreeL) resource (register IFREEL in Addendum 6). If there are no buffers left, the task will be suspended. The buffers are released back to the free list when a channel command which used this buffer indicates that the buffer is to be released.

Semaphore

The semaphore register semr has 32 bits. Each of them is directly accessible using the Bit Change Immediate (BITCI) and BITC commands of the microcontroller. The semaphores are used for protection and communication between tasks.

If the BITCI or BITC command attempts to write the same value to the bit as the current bit value, it will be aborted and its task will be suspended. Later on, when the semaphore register is changed (any bit in the register is changed), all tasks which are waiting for a semaphore will be made Ready and will try to execute the Bit_Change_Immediate command again.

Bits 31–24 of the semaphore register can be set by changing respective predetermined external pins (not shown) of PIF 110 from 0 to 1.

Addendum 3

Tasks Wait Conditions

There are two conditions which may cause the Wait signal to be asserted:

(1) Register Scoreboard

For each register in the microcontroller there is a scoreboard bit which indicates its status. If the bit is set, the register is dirty, i.e. waiting for data to be loaded by the LSU 330. A possible scenario is as follows:

(a) A task requests loading the register by the LSU.
   (b) The task requests using this register as a source. However, the scoreboard is dirty. Hence, the Wait signal is asserted.
   (c) Then the LSU loads the register.
   (d) The task again requests using this register as a source. This time the usage is permitted.

(2) LSU FIFO Full

This is another condition to generate the wait signal. Once the LSU FIFO that queues the load and store requests becomes ready this condition is cleared.

Addendum 4

The following table lists some signals used in the channel/microcontroller interface. "I" means the signal is an input for the channel. "O" means the signal is a channel output.

TABLE A4-1

| Signal name | Width | I/O | Function |
| --- | --- | --- | --- |
| Indication | | | |
| csem[5:0] | 6 | O | Semaphore ID; CSEM[5] = SCRATCH/NOP Indication |
| cstrobe | 1 | O | Semaphore SET strobe |
| Command FIFO | | | |
| mfload[7:0] | 8 | I | CMD FiFo Load strobes (<Channel>, I/E) |
| ccmdfull[7:0] | 8 | O | CMD FIFO Full (<Channel>, I/E) |
| Req/Status FiFo | | | |
| cfifordy[15:0] | 16 | O | FIFO RDY (READY) (<Channel>, I/E, Req/Stt) |
| mfsel[3:0] | 4 | I | FIFO Select address (<Channel>, I/E, Req/Stt) |
| mfrd | 1 | I | FIFO Read Strobe |

Addendum 5

Memory

Map of Internal Memory 170

Figure 14:
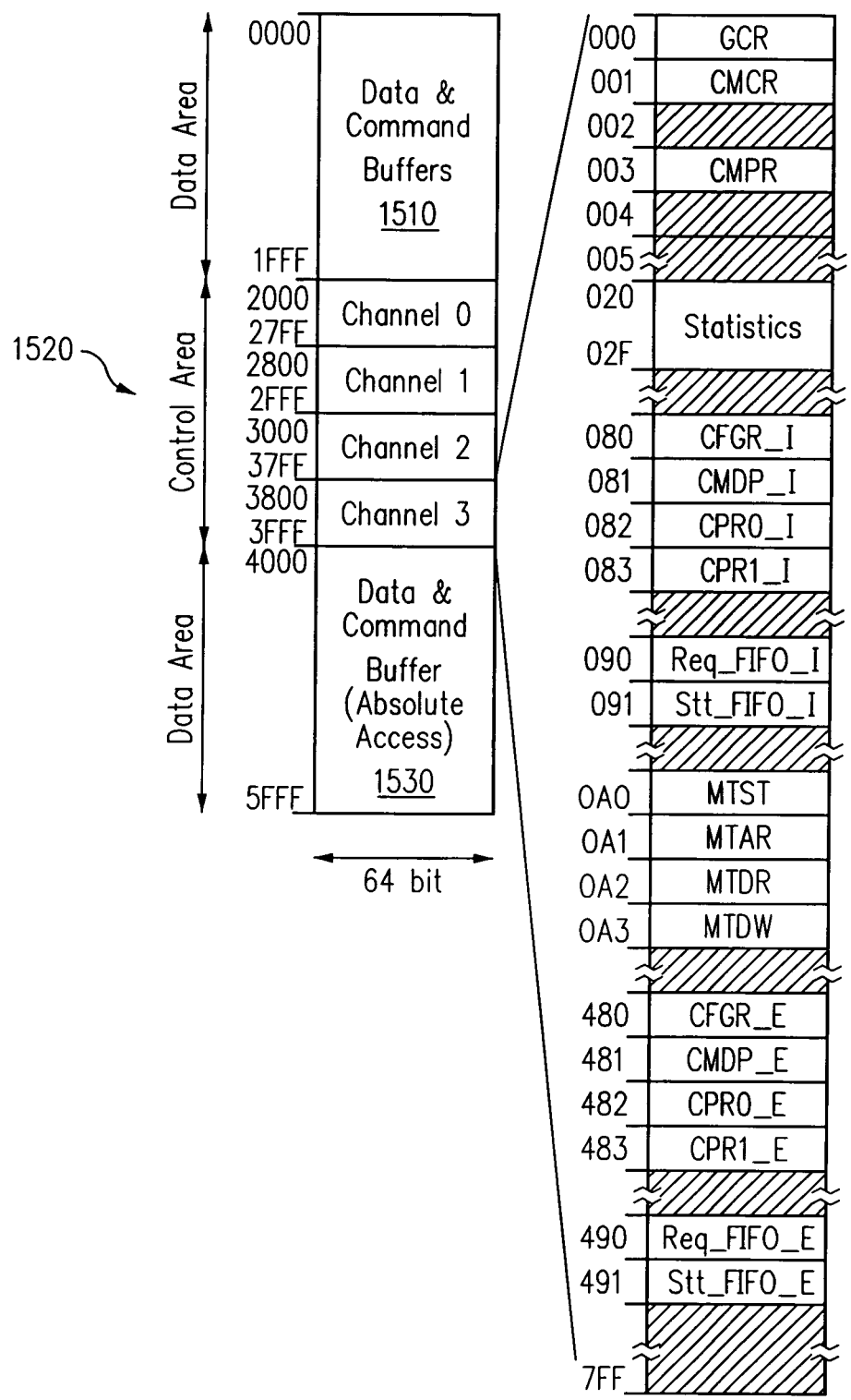
FIG. 14 is a memory map for the system of FIG. 1.

The internal memory map is shown in FIG. 14.

Data Area 1510 (Addresses 0000-1FFF HEX)

This area is used for the Scratch Pad 1610 and the Data and Command FIFOs. This area is accessed using relative addresses. The data area memory map is shown in FIG. 15.

Figure 15:
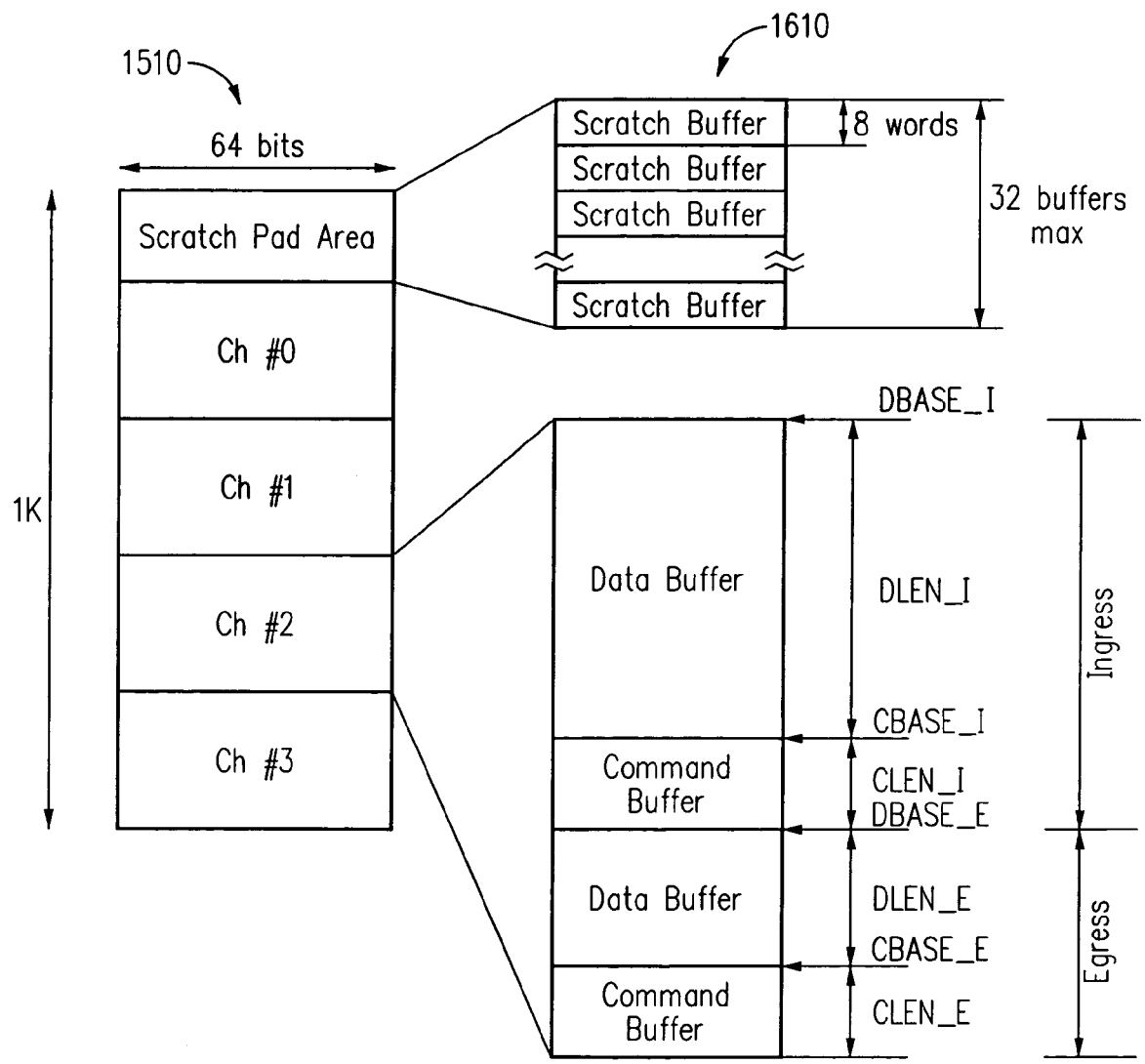
FIG. 15 is a data area memory map for the system of FIG. 1.

In FIG. 15, "DBASE_I" is the "DBASE" field of the CFGR register (described below) for the ingress side. Similarly, DLEN, CBASE, CLEN are fields of the corresponding CFGR register. The suffix "_I" stands for ingress, and "_E" stands for egress.

Control Area 1520 for Each Channel

One of the register types in this area is:

CFGR—Channel Configuration Register (Ingress & Egress)

There are 8 CFGR registers, one per direction of each channel. Their fields are:

DBASE (9 bits) Data Buffer Base Pointer (64 bytes aligned)

DLEN (7 bits) Data Buffer Length (64 bytes granularity)

CBASE (9 bits) Command Buffer Base Pointer (64 bytes aligned)

CLEN (3 bits) Command Buffer Length (64 bytes granularity)

GAP (4 bits) Minimum gap between Data Read and Write pointers when the Frame Control Word is invalid (8 bytes granularity)

Data Area 1530 (Address 4000-5FFF HEX)

This area is described in the aforementioned U.S. patent application Ser. No. 09/055,044.

Addendum 6

Microcontroller Registers

Register File Map

Figure 16:
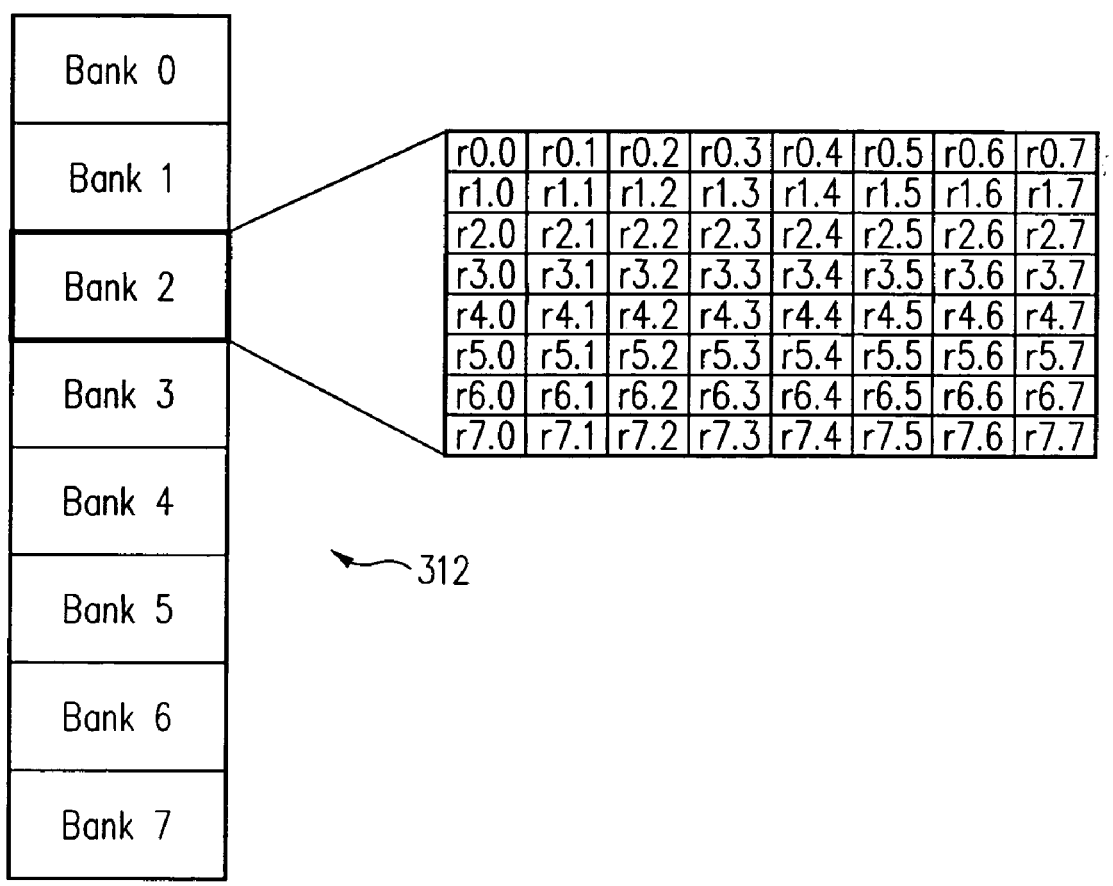
FIG. 16 is a register file map for the processor of FIG. 1.

The register file 312 is divided into eight banks (FIG. 16). Each bank is dedicated to a pair of ingress and egress tasks from the same channel 150.x. In some embodiments, the ingress task uses more registers than an egress task because ingress processing is more complex. In some embodiments, task software is such that there are no common registers between the two tasks.

Each register r0.0–r7.7 is 1 byte wide. 8 consecutive bytes can be read in parallel from the register file. To form a 7-bit address of an 8-byte register word, the register number (0 through 63) is concatenated with the bank ID which itself is a concatenation of the channel ID "CHID" and the task pair number SN (0 or 1); the address MSB is 0 to indicate register file 312 (versus special registers 314).

Microcontroller Register Map

All registers in the microcontroller are directly accessible through microcontroller commands. The register map is divided into two regions: register file 312 and special registers 315. A register address consists of 7 bits. For the special registers 315, the address MSB is 1; for the register file 312, the MSB is 0.

Data Memory 316

Figure 17:
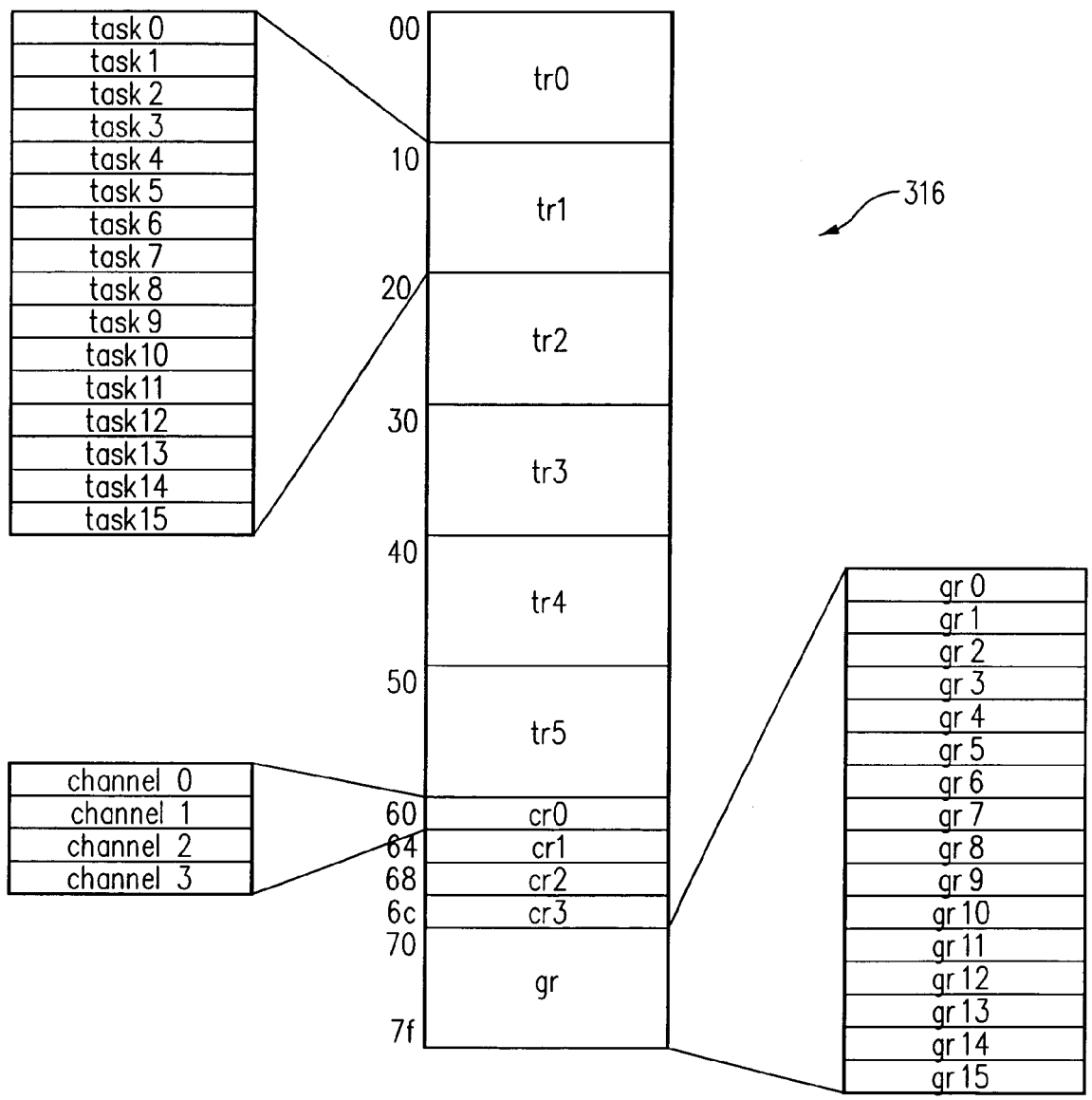
FIG. 17 is a data memory map for the processor of FIG. 1.

Data memory 316 (FIG. 17) is used for temporary storage of variables as well as for some parameters described below. Data memory 316 is therefore divided into three regions:

a. For each task, tasks registers tr0–tr5 (6 per task). These registers are dedicated to the respective task.

b. Channel registers cr0–cr3 (4 per channel 150.x). These registers are dedicated to a hardware task. All tasks of the same channel (two ingress and two egress tasks) have access to these registers.

c. Global registers gr (16 registers). These registers are global for all the tasks.

Data memory 316 is 128 words of 32 bits.

Figure 18:
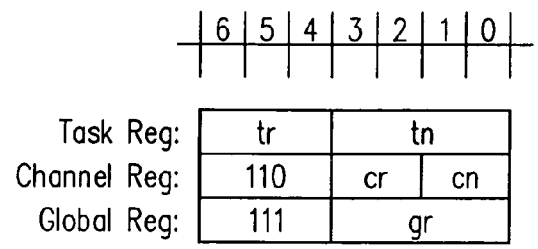
FIG. 18 illustrates address generation for the data memory of FIG. 17.

The 7-bit address generation scheme for data memory 316 is shown in FIG. 18, where:

tr is Task Register number (0–5).

tn is Task Number (0–15) (tr and tn form a task register address).

cr is Channel Register number (0–3; "110," cr, cn form a channel register address).

cn is Channel Number (0–3).

gr is Global Register number (0–15).

Special resisters (SR) 315 (see the table A6-1 below) are directly accessible through microcontroller commands (similar to the register file). Special registers 315 may be divided into three types:

a. registers which belong to a task, such as Program Counter (PC), Task Number (TIN), etc.

b. resource registers, such as Request FIFO (reqf), Status FIFO (sttf), Search Machine Command (scmd), etc. (see Addendum 2).

c. Data memory 316 registers, such as task registers (tr), channel registers (cr) and global registers (gr).

The resources and the data memory 316 (note types b and c) are mapped into the special registers to simplify their access.

Pertinent special registers are summarized in the following table.

TABLE A6-1

Special Registers

| Address | name | type | access | width | total | comment |
| --- | --- | --- | --- | --- | --- | --- |
| 1000_000 | null | — | r | 32 | — | zero data |
| 1000_001 | one | — | r | 32 | — | all ones data |
| 1000_010 | pc | a | rw | 16 | 16 | program counter |
| 1000_011 | tn | a | r | 4 | 1 | task number |
| 1000_100 | ctl | a | rw | 16 | 1 | general control register |
| 1000_101 | dmaa | a | rw | 32 | 1 | program download address |
| 1000_110 | reqf | b | r | 16 | 8 | request fifo |
| 1000_111 | sttf | b | r | 16 | 8 | status fifo |
| 1001_000 | imp | a | rw | 10 | 16 | internal memory pointer |
| 1001_001 | xmp | a | rw | 16 | 16 | external memory pointer |
| 1001_100 | cmd_i | b | w | 64 | fifo | ingress command |
| 1001_101 | cmd_e | b | w | 64 | fifo | egress command |
| 1001_110 | cmd_il | b | w | 64 | fifo | ingress command (lock) |
| 1001_111 | cmd_el | b | w | 64 | fifo | egress command (lock) |
| 1010_000 | scmd | b | rw | 64 | 16 | SM command/result |
| 1010_001 | scmde | b | rw | 64 | 16 | SM command/result extension |
| 1010_010 | xfreel | b | rw | 16 | 4 | external free list |
| 1010_011 | timer | a | rw | 50 | 1 | general timer |
| 1010_100 | smcntl | a | rw | 17 | 1 | search machine control reg. |
| 1010_101 | flcnt | a | r | 17 | 4 | external free list counter |
| 1010_110 | age10 | a | r | 16 | 4 | head of age list #0 |
| 1010_111 | age11 | a | r | 16 | 4 | head of age list #1 |
| 1011_000 | semr | a | rw | 32 | 1 | semaphore reg |
| 1011_001 | ifreel | b | rw | 5 | 1 | internal free list |
| 1011_010 | ifreer | b | rw | 32 | 1 | internal free register |
| 1011_011 | miir | a | rw | 32 | 1 | mii register |
| 1011_100 | msgr | a | rw | 32 | 1 | message register |
| 1011_110 | thrshl0 | a | rw | 16 | 4 | age threshold #0 |
| 1011_111 | thrshl1 | a | rw | 16 | 4 | age threshold #1 |
| 1100_iii | tr0-5 | c | rw | 32 | 96 | task register |
| 1101_0ii | cr0-3 | c | rw | 32 | 16 | channel register |
| 1101_111 | pmdr | a | r | 32 | 1 | program memory data register |
| 111i_iii | grO-15 | c | rw | 32 | 16 | general register |

Register fields of some special registers are as follows:

PC—Program Counter & Flags

PC (10 bits) Program Counter

G (1 bit) Flag—Greater

L (1 bit) Flag—Less

E (1 bit) Flag—Equal

C (1 bit) Flag—Carry

G, L, E, and C are read-only.

TN—Task Number

CHID (2 bits) Channel Id

SN (1 bit) Sequence Number

I/E (1 bit) Ingress(0)/Egress(1)

SCMD,SCMDE—Command and Command Extension

During write operations these 32-bit registers form a command for the search machine. During read operations these registers provide the result.

SCMDE should be written prior to SCMD.

XFREEL—External Free List

A write to this register causes adding a block to the free list stack in external memory 200. A read from this register causes removing a block from the stack.

There is one free list stack per channel. Each register contains a 16-bit pointer to the top of the stack.

TIMER—General Timer
Timer (32 bits) Timer value.
    The timer is a free running counter advanced every 8 system clock ticks.
NXTE (16 bits) Pointer to the next entry to examine for aging.
    This field is write only. Should be initialized after reset.
ET (1 bit) Enable Timer Update.
    This field is used during write operations.
    If ET=1, the timer counter gets the value being written. If ET=0, the timer counter is not affected by the write.
EN (1 bit) Enable Next Entry Update. This field is used during write operations. If EN=1, the NXTE pointer gets the new value. If EN=0, the NXTE field is invalid.

SMCNTL—Search Machine Control Register
Pointer (16 bits) Node area start pointer.
    This pointer defines the search node area (the bottom of this area is 0xFFFF). The automatic aging mechanism will be performed only inside this area.
AGE (1 bit) Aging Enable (0-disable; 1-enable).

FLCNT—Free List Counter
    This read only register contains the number of entries in the free list in the scratch pad area of memory 170.
Count (17 bits) Counter (max value is 0x10000)

AGEL0, AGEL1—Head of Age List 0,1
    These are read only registers (two per channel). Each contains the top of the age list (there are two age lists per channel). A read from any one of these registers causes the register to clear. Of note, the TSTMP (time stamp) field in the node (Addendum 8) is used to link nodes together in this list. When the register is 0, the list is empty.
Pointer (16 bits) Top of the List pointer.

THRSHL0, THRSHL1—Threshold Register
    Each of these registers contains the threshold associated with the corresponding Age List.
    When |current_time−timestamp|>threshold, and the entry is of type LRND (learned entry), the entry is added to the Age List.
threshold (16 bits) Threshold value MSGR—Message Register is used to transfer messages between the microcontroller and switch 120 CPU (not shown). The messages are transferred through the Header line.
MSGA (16 bits) Message to CPU when writing MSGR, and from CPU when reading the register. This field is cleared after read.
MSGB (16 bits) Message to CPU when reading the register (for testing).

DMAA—DMA Address
OP (3 bits) Operation
    000—nop
    001—Load from EPROM 204
    010—Load from switch 120
    111—Release
EPA (13 bits) EPROM Start Address
LER (1 bit) Load Error
PMA (10 bits) Program Memory Address SEMR—Semaphore Register
S[i] (1 bit) Semaphore bit "i"

IFREER—Internal Free Register (16 bits)
F[i] (1 bit) indicates whether Block "i" in the scratch pad area of memory 170 is free.

IFREEL—Internal Free List
BLKN (5 bits) Free Block Number (i.e. scratch buffer number; see FIG. 15). A read of this register removes the scratch buffer BLKN from the free list. A write to this register returns to the free list the buffer identified by the BLKN value being written.

MIIR—MII Control Register
    This register is used to communicate with Ethernet PHY devices through MII control interface.
BSY (1 bit) Busy.
    Set with a new command, and reset when the command is done.
CMD (4 bits) Command
    1000—Scan On
    0000—Scan Off
    0100—Send Control Info
    0010—Read Status
NV (1 bit) Not Valid.
    Set when the data from PHY is not valid.
FIAD (5 bits) PHY Address.
RGAD (5 bits) Register Address.
Data (16 bits) Data.

Addendum 7

Microcontroller Instructions

Three Operand Instructions

These instructions perform arithmetic and logic operations between Operand_A and Operand_B. The result is written to Operand_C. The instructions are:
    ADD—Add
    SUB—Subtract
    OR—Logical OR
    AND—Logical AND
    XOR—Logical XOR
    SHL—Shift Left
    SHR—Shift Right
    BITC—Bit Change
The instruction Size field specifies the operand sizes.
A two-bit "dt" field (destination type) in the instruction specifies the type of Operand_C as follows:
    dt=00—Operand_C is a register in register file 312 or special registers 315.
    dt=10—Operand_C is in memory 170. The Operand_C field is used as 7 bits immediate value in the Load/Store Unit for address generation.
    dt=x1—Operand_C is in external memory 200. The Operand_C field together with dt[1] bit is used as an 8 bit immediate value in the Load/Store Unit for address generation.

Note that instructions with non-zero dt cannot use resources as their operands.

Two Operand Instruction with an Immediate Byte

These instructions perform arithmetic or logic operation between Operand_A and an immediate byte. The result is written to Operand_C. The instructions are:

ADI—Add Immediate
SBI—Subtract Immediate
ORI—Logical OR Immediate
ANDI—Logical AND Immediate
XORI—Logical XOR Immediate
SHLI—Shift Left Immediate
SHRI—Shift Right Immediate
BITCI—Bit Change Immediate The Size field specifies the sizes of operands.

A two-bit "dt" field (destination type) of the instruction specifies the type of the Operand_C field as in the three-operand instructions.

Two Operand Instructions

These instructions perform move and compare operations between two operands. The instructions are:

MOVE—MOVE Operand A to Operand C
CMP—Compare Operand C to Operand A

The size field of the instruction specifies the sizes of operands.

One Operand Instructions with Immediate

These instructions perform move and compare operations between an operand and an immediate field. The instructions are:

MVIW—MOVE Immediate Word
MVIB—MOVE Immediate Byte
CPIB—Compare Immediate Byte
CPIW—Compare Immediate Word The size field of the instruction specifies the size of Operand_C.

Special One Operand Instructions with Immediate Field

These instructions perform an operation on Operand C as follows:

SMWR—Search Machine Write
CMD—Channel Command Write
CASE—Case statement
BTJ—Bit Test and Jump Load & Store Instructions These instructions perform Load and Store operation between Operand A and memory 170 or 200. The instructions are:

LOAD
STORE

The "dt" field (destination type) specifies the type of destination as follows:

dt=10—Destination is memory 170. The immediate field is used as a 7 bit immediate value in the Load/Store Unit for address generation.

dt=x1—Destination is memory 200. The immediate field together with the dt[1] bit is used as an 8 bit immediate value in the Load/Store Unit for address generation.

Special Immediate Instruction

This instruction is CMDI (Command Immediate). It is used to write to a command FIFO.

Selected Instructions

ADD, SUB, ADI, SBI

Flags:
  E is set when result is equal to zero
  C is set when Carry (for ADD, ADI) or Borrow (for SUB, SBI) is generated (based on operand opC size)

OR, AND, XOR, SHL, SHR, ORI, ANDI, XORI, SHLI, SHRI

Flags:
  E is set when result is equal to zero

BITC—Bit Change.
Operands: bits [31:25]=opC, [24:18]=opA, [17:16]=dt, [14:8]=opB, [7]=v
Operation: opC<-opA[opB]<-v (i.e. opC receives the value of opA except that the bit number opB in opC is set to v)
Flags:
  E is set when (opA[opB]==v)

BITCI—Bit Change Immediate
Operands: bits [31:25]=opC, [24:18]=opA, [17:16]=dt, [12:8]=imm, [7]=v
Operation: opC<-opA[imm]<-v
Flags:
  E is set when (opA[imm]==v)

CMP—Compare
Operands: bits [31:25]=opC, [24:18]=opA, [7:5]=operand size
Operation: opC?opA
Flags:
  E is set when (opC==opA)
  G is set when (opC>opA)
  L is set when (opC<opA)

CPIW—Compare Immediate Word
Operands: bits [31:25]=opC, [23:8]=imm
Operation: opc?imm
Flags:
  E is set when (opC==imm)
  G is set when (opC>imm)
  L is set when (opC<imm)

CPIB—Compare Immediate Byte
Operands: bits [31:25]=opC, [23:16]=bit_mask, [15:8]=imm
Operation: (bit_mask & opC)?imm
Flags:
  E is set when ((bit_mask&opC)==imm)
  G is set when ((bit_mask&opC)>imm)
  L is set when ((bit_mask&opC)<imm)

LOAD—Load from Internal or External Memory
Operands: bits [31:25]=aop, [24:18]=opA, [17:16]=dt, [7]=i, [6]=f
Operation:
  if [dt==10] opA<-IM[{aop,imp}]; imp=imp+i;
  if [dt==x1] opA<-XM[{aop,xmp}]; xmp=xmp+i;
  IM is internal memory 170; imp is the internal memory pointer register (Table A6-1);
  XM is external memory 200; xpm is the external memory pointer register (Table A6-1).
  When the f bit is set, the execution of load instruction is delayed if previous store operation from the same channel is not complete.

aop is address bits concatenated with imp or xmp ("{ }" indicates concatenation).

STORE—Store to Internal or External Memory
Operands: bits [31:25]=aop, [24:18]=opA, [17:16]=dt, [7]=i
Operation:
   if [dt==10] opA->IM[{aop,imp}]; imp=imp+i;
   if [dt==x1] opA->XM[{aop,xmp}]; xmp=xmp+i;
   IM, XM, imp, xmp, and aop have the same meaning as for the LOAD instruction.

SMWR—Search Machine Command Write
Operands: bits [31:25]=opC, [23:8]=imm
Operation: scmd<-{opC[63:16], imm}

CMDI—Immediate Command to Channel
Operands: bits [31:8]=imm, [7]=L, [6]=P
Operation:
   Command_port<-{40'b0, imm}
   where 40'b0 denotes 40 binary zeroes.
   if P=0, Command_port=cmd_i; (Ingress Command)
   if P=1, Command_port=cmd_e; (Egress Command)
   The instruction L flag (1 bit) is Lock/Unlock control
   (when set, the lock state in the instruction is changed)

CMD—Command to Channel
Operands: bits [31:25]=opC, [23:8]=imm, [7]=L, [6]=P
Operation:
   Command_port<-{opC[63:16], imm}
   if P=0, Command_port=cmd_i; (Ingress Command)
   if P=1, Command_port=cmd_e; (Egress Command)
   The 1-bit L flag in the instruction is Lock/Unlock control
   (when set, the lock state is changed)

Case
Operands: bits[31:25]=opC, [23:16]=bit_mask, [12:8]=shift
Operation: PC<-PC+((opC&bit_mask)>>shift)+1

BTJ—Bit Test and Jump
Operands: bits [31:25]=opC, [24:13]=addr, [12:8]=bit, [7]=v
Operation: if (opC[bit]==v) then PC<-addr Addendum 8

Search Machine

The search machine uses the well-known PATRICIA tree structure (see U.S. Pat. No. 5,546,390 "Method and Apparatus for Radix Decision Packet Processing" issued Aug. 13, 1996 to G. C. Stone and incorporated herein by reference).

Figure 19:
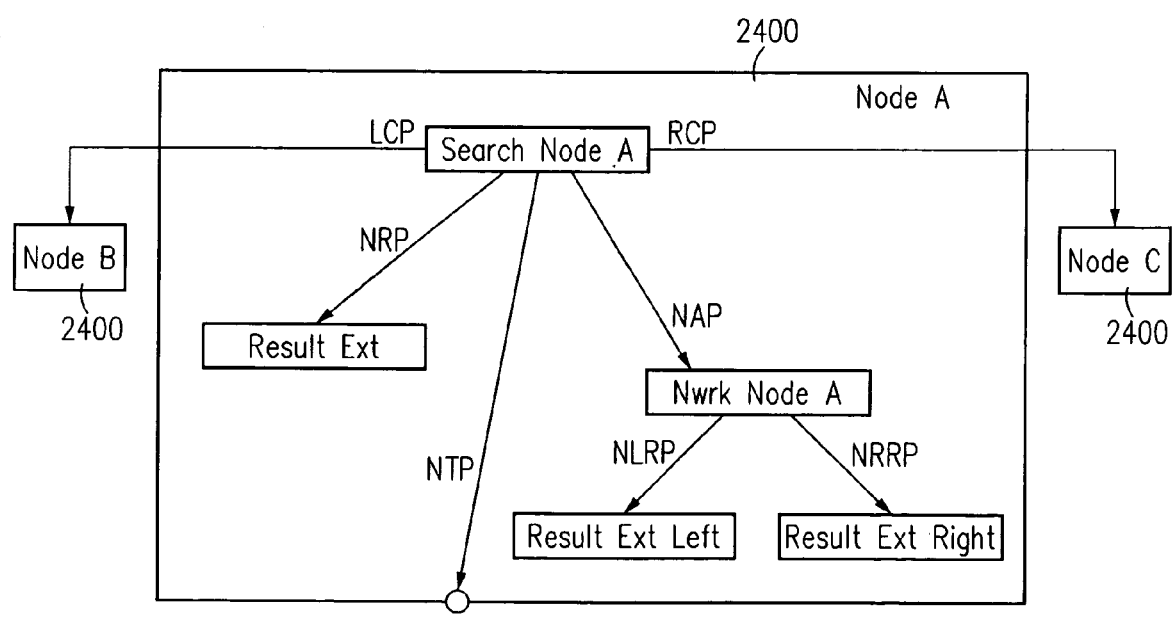
FIG. 19 illustrates tree nodes in the address resolution database used by the system of FIG. 1.

FIG. 19 Illustrates tree nodes 2400. Each node is four 64-bit words long. The node formats are as follows.

Search Node format

| Abbrev | Name | Size | Description |
|---|---|---|---|
| LCP | Left Child Pointer | 16 entry | Pointer to another radix node |
| RCP | Right Child Pointer | 16 entry | Pointer to another radix node |
| NAP | Ntwk Addr Pointer | 6 | Pointer to a network address node |
| BIX | Bit Index | 6 | the bit that this radix node is testing for |
| FLG | Flags | 1 | bit 54-LVD-Left network address valid in network address node. 0-Invalid; 1-Valid |
|  |  | 1 | bit 55-RVD-Right network address valid in network address node. 0-Invalid; 1-Valid |
|  |  | 1 | bit 56-LUP-Left Child pointer is an upward pointer or a downward pointer 0-downward; 1-upward |
|  |  | 1 | bit 57-RUP-Right Child pointer is an upward pointer or a downward pointer 0-downward; 1-upward |
| TYP | Type | 6 | bits 61:58-Tells the type of radix node 0000-Free List Entry. 0001-Static Entry that does not allow for aging. 0010-Learned Entry that allows for aging 0011-Root Entry 0100-Synthetic Entry contains no real key. 0101-Network Entry 0110-Dirty Entry that is waiting for configuration 0111-User Defined Entry 1000-Aged Entry 1001-Deleted Root entry bits 62 Identifies the timer 0-Timer 0; DEFAULT VALUE 1-Timer 1 63-RESERVED |
| KEY | Key | 48 | Different searches compare different number of bits. DA (Ethernet destination address) is 48 bits, IP is 32 bits, SA (Ethernet source address) is 48 bits. |
| RTP | Root Pointer | 16 | Pointer to the root of my tree |
| TSTNP | Timestamp | 16 | Last time the entry was used |
| ECNT | Entry Count | 16 | # of times the entry was used |
| UNIFO | User Information | 64 | User definable fields. Ex: UINFO[63:60] - State. UINFO[59:56] - Flags. UINFO[23:0] - VPI/VCI. For Ingress. |
| NRP | Next Result Pointer | 16 | Pointer to an optional 4 word entry that is part of the result of this node. 0x00 - means NULL and no additional link exists |
| NTP | Next Tree Pointer | 16 | Pointer to a Patricia Tree. Allows hierarchical searching. 0x00 - means NULL and no additional link exists. |

Root Node format

| Abbrev | Name | Size | Description |
|---|---|---|---|
| LCP | Left Chil Pointer | 16 | Pointer to another radix node entry |
| RCP | Right Child Pointer | 16 | Pointer to another radix node entry |
| NAP | Ntwk Addr Pointer | 16 | Pointer to a network address node |
| BIX | Bit Index | 6 | the bit that this radix node is testing for. For a ROOT node BIX = 0x2f |
| FLG | Flags | 1 | bit 54-LVD-Left network address valid in network address node. 0-Invalid; 1-Valid |
|  |  | 1 | bit 55-RVD-Right network address valid in network address node. 0-Invalid; 1-Valid |

Root Node format

| Abbrev | Name | Size | Description |
|---|---|---|---|
|  |  | 1 | bit 56-LUP-Left Child pointer is an upward pointer or a down-ward pointer<br>0-downward; 1-upward |
|  |  | 1 | bit 57-RUP-Right Child pointer is an upward pointer or a downward pointer<br>0-downward; 1-upward |
| TYP | Type | 6 | bits 61:58-Tells the type of radix node<br>TYPE field is set to 0011 for a ROOT node.<br>Key is implicit in this case; left children see a Key of 0x000000 and right children see a key of 0xffffff.<br>bit 62-0<br>bit 63-(RESERVED). |
| NTP | Next Tree Pointer | 16 | Next Tree Pointer field is used to link up several roots during the delete tree process.<br>This field is different from the Radix Note NTP field because the SM 190 is the one that gets to write to it. The microcontroller does not have access to this field in a ROOT node. It is used for the sole purpose of deleting trees. |

Synthetic Node format

| Abbrev | Name | Size | Description |
|---|---|---|---|
| LCP | Left Chil Pointer | 16 | Pointer to another radix node entry |
| RCP | Right Child Pointer | 16 | Pointer to another radix node entry |
| NAP | Ntwk Addr Pointer | 16 | Pointer to a network address node |
| BIX | Bit Index | 6 | the bit that this radix node is testing for. For a ROOT node BIX = 0x2f |
| FLG | Flags | 1 | bit 54-LVD-Left network address valid in network address node.<br>0-Invalid; 1-Valid |
|  |  | 1 | bit 55-RVD-Right network address valid in network address node.<br>0-Invalid; 1-Valid |
|  |  | 1 | bit 56-LUP-Left Child pointer is an upward pointer or a downward pointer<br>0-downward; 1-upward |
|  |  | 1 | bit 57-RUP-Right Child pointer is an upward pointer or a downward pointer<br>0-downward; 1-upward |
| TYP | Type | 6 | bits 61:58-Tells the type of radix node<br>TYPE field is set to 0100 for a synthetic entry.<br>Key is derived from the Network Address that is sitting on this synthetic entry.<br>bit 62-0<br>bit 63-0 (RESERVED). |

Synthetic Node format

| Abbrev | Name | Size | Description |
|---|---|---|---|
| KEY | Key | 48 | The key is derived from the network address node that it is storing. |
| RTP | Root Pointer | 16 | Pointer to the root of my tree |

Network Address Node format

| Abbrev | Name | Size | Description |
|---|---|---|---|
| LNA | Left Network Address | 32 | Network Address |
| NLRP | Next Left Result Pointer | 16 | Pointer to a 4 word node where additional results are stored. |
| LMASK | Left Network Mask | 6 | Network Mask. Assumes a contiguous mask of 1's. This value tells the position of the last 1 |
| TYPE | Type | 6 | bits 61:58- 0101<br>bit 62-0<br>bit 63-0 (RESERVED) |
| LUINFO | Left User Information | 64 | User defined field for the left network address. E.g.: VPI/VCI, State, Flags etc. |
| RNA | Right Network Address | 32 | Network Address |
| RMASK | Right Network Mask | 6 | Network Mask. Assumes a contiguous mask of 1's. This value tells the position of the last 1 |
| NRRP | Right Next Result Pointer | 16 | Pointer to a 4 word node where additional results are stored. |
| RUINFO | Right User Information | 64 | User defined field for the right network address. E.g. VPI/VCI, State, Flags etc. |

Free Node format

| Abbrev | Name | Size | Description |
|---|---|---|---|
| TYP | Type | 6 | bits 61:58- 0000<br>bit 62-0<br>bit 63-0 (RESERVED) |
| NFP | Next Free Pointer | 16 | Pointer to the next item on the free list |

Search Machine Commands

A. Search

| Abbrev | Name | Size | Description |
|---|---|---|---|
| OP | Op Code | 8 | bits 3:0 = 0000<br>bit 4-Key Length<br>0–32 bits; 1–48 bits<br>bits 7:5 - (RESERVED) |
| FLAGS | Flags | 8 | bit 8 - Auto Learn<br>bit 9 - Auto increment ECNT<br>bits 15:10 - reserved |
| KEY | Search Key | 48 | If search is for 32 bit entry, the most significant part is used. |

-continued

A. Search

| Abbrev | Name | Size | Description |
|---|---|---|---|
| RTP | Root Pointer | 16 | Pointer to the root of Patricia Tree |

Note:
Searching with Root pointer equal NULL will create a new tree.

Host address response

| Abbrev | Name | Size | Description |
|---|---|---|---|
| UINFO | User Info | 64 | The UINFO field of found entry. If not fount, the UINFO will be zero. |
| NTP | Next Tree Pointer | 16 | Pointer to a next level Patricia tree for hierarchical searching. |
| RXP | search Node pointer | 16 | Pointer to the search node that matched the key. |
| NRP | Next Result Pointer | 16 | Pointer to an additional 4 word entry |
| ECNT | Entry Count | 16 | # of times the entry was used |

Network address response

| Abbrev | Name | Size | Description |
|---|---|---|---|
| UINFO | User Info | 64 | The UINFO field of found entry. If not found, the UINFO will be zero. |
| NAP | Next Tree Pointer | 16 | Pointer to the network address node that matched. |
| NRP | Next Result Pointer | 16 | Pointer to an additional 4 word entry |
| LRF | Left/Right Ntwrk Addr | 1 | 0-Left Network Address; 1-Right Network Address |

B. Insert Host

| Abbrev | Name | Size | Description |
|---|---|---|---|
| OP | Op Code | 8 | bits 3:0 = 0001<br>bit 4-Key Length<br>  0–32 bits; 1–48 bits<br>bits 7:5-000 (RESERVED). |
| KEY | Search Key | 48 | If search is for 32 bit entry, the most significant part is used. |
| RTP | Root Pointer | 16 | Pointer to the root of Patricia Tree |
| RXP | Search Node pointer | 16 | Pointer to a pre-established Search Node |

Note:
If Root pointer equals NULL, new tree will be created.

Response

| Abbrev | Name | Size | Description |
|---|---|---|---|
| RTP | Root Pointer | 16 | Pointer to the root of Patricia Tree |
| RXP | Search Node pointer | 16 | Pointer to a pre-established Search Node |

C. Insert Network Address

| Abbrev | Name | Size | Description |
|---|---|---|---|
| OP | Op Code | 8 | bits 3:0 = 0010<br>bit 4-Key Length<br>  0–32 bits; 1–48 bits<br>bits 7:5-000 (RESERVED). |
| FLAGS | Flags | 8 | bits 13:8-Mask Level (16 to 47)<br>bits 15:14-reserved |
| KEY | Search Key | 48 | Search Key. |
| RTP | Root Pointer | 16 | Pointer to the root of Patricia Tree |

Response

| Abbrev | Name | Size | Description |
|---|---|---|---|
| RTP | Root Pointer | 16 | Pointer to the root of Patricia Tree |
| NAP | Next Tree Pointer | 16 | Network address node where NTWK address was installed |
| LRF | Left/Right Ntwrk Addr | 1 | 0-Left Network Address; 1-Right Network Address |

D. Delete Host

| Abbrev | Name | Size | Description |
|---|---|---|---|
| OP | Op Code | 8 | bits 3:0 = 0011<br>bit 4-Key Length<br>  0–32 bits; 1–48 bits<br>bits 7:5-000 (RESERVED). |
| KEY | Search Key | 48 | Search Key. |
| RTP | Root Pointer | 16 | Pointer to the root of Patricia Tree |

Response

| Abbrev | Name | Size | Description |
|---|---|---|---|
| RTP | Root Pointer | 16 | Pointer to the root of Patricia Tree |
| RXP | Search Node pointer | 16 | Pointer to a Search Node |

E. Delete Network

| Abbrev | Name | Size | Description |
|---|---|---|---|
| OP | Op Code | 8 | bits 3:0 = 0100 |
|  |  |  | bit 4-Key Length |
|  |  |  | 0–32 bits; 1–48 bits |
|  |  |  | bits 7:5-000 (RESERVED). |
| FLAGS | Flags | 8 | bits 13:8-Mask Level (16 to 48) |
|  |  |  | bits 15:14-reserved |
| KEY | Search Key | 48 | Search Key. |
| RTP | Root Pointer | 16 | Pointer to the root of Patricia Tree |

Response

| Abbrev | Name | Size | Description |
|---|---|---|---|
| RTP | Root Pointer | 16 | Pointer to the root of Patricia Tree |
| NAP | Next Tree Pointer | 16 | Network address node where NTWK address was installed |
| RTP | Root Pointer | 16 | Pointer to the root of Patricia Tree |
| LRF | Left/Right Ntwrk Addr | 1 | 0-Left Network Address; 1-Right Network Address |

F. Delete Tree

| Abbrev | Name | Size | Description |
|---|---|---|---|
| OP | Op Code | 8 | bits 3:0 = 0101 bits 7:4-0000 |
| RTP | Root Pointer | 16 | Pointer to the root of Patricia Tree |

Response

| Abbrev | Name | Size | Description |
|---|---|---|---|
| RTP | Root Pointer | 16 | Pointer to the root of Patricia Tree |

G. Find Network

| Abbrev | Name | Size | Description |
|---|---|---|---|
| OP | Op Code | 8 | bits 3:0 = 0110 |
|  |  |  | bit 4-Key Length |
|  |  |  | 0–32 bits; 1–48 bits |
|  |  |  | bits 7:5-000 (RESERVED). |
| FLAGS | Flags | 8 | bits 13:8-Mask Level (16 to 47) |
|  |  |  | bits 15:14-reserved |
| KEY | Search Key | 48 | Search Key. |
| RTP | Root Pointer | 16 | Pointer to the root of Patricia Tree |

Response

| Abbrev | Name | Size | Description |
|---|---|---|---|
| RTP | Root Pointer | 16 | Pointer to the root of Patricia Tree |
| NAP | Next Tree Pointer | 16 | Network address node where NTWK address was installed |
| LRF | Left/Right Ntwrk Addr | 1 | 0-Left Network Address; 1-Right Network Address |

What is claimed is:

1. A multi-tasking processor for executing computer instructions for a plurality of tasks, the processor being operable to either suspend a task or to re-execute a task's instruction without suspending the task, the processor comprising circuitry for:

scheduling tasks for execution, and executing tasks scheduled for execution;

obtaining first and second indications each of which is associated with a task being executed by the processor and with an instruction being executed for the associated task, each indication being an indication that the associated instruction is not to be executed to completion;

in response to each first indication, (i) suspending the associated instruction without executing the associated instruction to completion, and (ii) suspending the associated task, wherein suspended tasks are not scheduled for execution, the processor being operable to schedule another task for execution in lieu of the associated task; and in response to each second indication, suspending the associated instruction without executing the associated instruction to completion and without suspending the associated task, and re-executing the associated instruction without suspending the associated task.

2. The processor of claim 1 wherein the circuitry is to schedule a task or tasks for execution on each instruction executed by the processor such that whenever the processor is to execute any instruction, the circuitry is to perform the task scheduling to schedule a task that will execute the instruction.

3. The processor of claim 1 wherein:

the processor comprises an instruction execution unit for executing instructions stored in a memory and fetched from the memory; and on obtaining of any one of the first and second indications, the processor is operable to:

(a) suspend the associated instruction after the associated instruction has been fetched from the memory; and (b) re-fetch the associated instruction from the memory to re-execute the associated instruction.

4. The processor of claim 1 wherein the associated instruction is suspended after being decoded by the processor, and the associated instruction is decoded again when the associated instruction is being re-executed by the processor.

5. The processor of claim 1 wherein suspension of the associated task and scheduling of another task in lieu of the associated task does not involve instruction execution by the processor.

6. The processor of claim 1 wherein the processor comprises an instruction execution pipeline operable to concurrently execute instructions from different tasks, wherein on obtaining of any one of the first and second indications the processor is operable to suspend the associated instruction after the pipeline starts execution of one or more other instructions for one or more tasks other than the associated task but before the pipeline starts execution of any instruction following the associated instruction for the associated task.

7. The processor of claim 6 wherein the pipeline comprises an instruction decode stage, and the associated instruction is suspended after being processed by the decode stage.

8. The processor of claim 6 wherein the associated instruction is suspended in the pipeline's read stage in which instruction operands are read from storage and presented to instruction execution logic.

9. The processor of claim 1 wherein at least one first indication is obtained when the associated instruction is accessing a first resource and the first resource is unavailable to the associated instruction, and at least one second indication is obtained when the associated instruction is accessing a second resource and the second resource is unavailable to the associated instruction.

10. The processor of claim 1 wherein at least one first indication is obtained when the associated instruction is to access an unavailable resource, and the associated task remains suspended until the resource becomes available.

11. The processor claim 10 wherein the processor executes the associated instruction to completion when the resource becomes available.

12. The processor of claim 10 wherein the resource is a FIFO shared by the associated task and at least one other task.

13. The processor of claim 10 wherein the resource is a FIFO.

14. The processor of claim 13 wherein the FIFO is a request FIFO for storing requests to process network data, and for at least one first indication the associated instruction is an instruction to read the request FIFO.

15. The processor of claim 13 wherein the FIFO is a command FIFO for storing commands for processing of network data, and for at least one first indication the associated instruction is an instruction to write one or more commands to the command FIFO.

16. The processor of claim 13 wherein the FIFO is a status FIFO for storing status information on reception of network data over a network, and for at least one first indication the associated instruction is an instruction to read the status FIFO.

17. The processor of claim 1 wherein for each first indication, the circuitry is operable to re-execute the associated instruction when the associated task becomes unsuspended and scheduled again for execution.

18. The processor of claim 1 wherein for each first indication, the circuitry is operable to execute the associated instruction to completion when the associated task becomes unsuspended and scheduled again for execution.

19. A method for executing computer instructions by a multi-tasking processor operable to either suspend a task or to re-execute a task's instruction without suspending the task, the method comprising:
  scheduling tasks for execution, and executing tasks scheduled for execution;
  obtaining first and second indications each of which is associated with a task being executed by the processor and with an instruction being executed for the associated task, each indication being an indication that the associated instruction is not to be executed to completion;
  in response to each first indication, (i) suspending the associated instruction without executing the associated instruction to completion, and (ii) suspending the associated task, wherein suspended tasks are not scheduled for execution, the processor being operable to schedule another task for execution in lieu of the associated task; and
  in response to each second indication, suspending the associated instruction without executing the associated instruction to completion and without suspending the associated task, and re-executing the associated instruction without suspending the associated task.

20. The method of claim 19 wherein scheduling a task or tasks for execution is performed on each instruction executed by any one of the tasks such that whenever an instruction is to be executed, the task scheduling is performed to schedule a task that will execute the instruction.

21. The method of claim 19 wherein each of the first and second indications is received after the associated instruction has been fetched from a memory for execution; and
  the processor is operable to fetch the associated instruction again from the memory to re-execute the associated instruction.

22. The method of claim 19 wherein the first associated instruction is suspended after being decoded, and the associated instruction is decoded again when the associated instruction is being re-executed.

23. The method of claim 19 wherein suspension of the associated task and scheduling of another task in lieu of the associated task does not involve instruction execution.

24. The method of claim 19 wherein on obtaining of any one of the first and second indications the associated instruction is operable to be suspended while being executed in an instruction execution pipeline after the pipeline starts execution of one or more other instructions for one or more tasks other than the associated task but before the pipeline starts execution of any instruction following the associated instruction for the associated task.

25. The method of claim 24 wherein the pipeline comprises an instruction decode stage, and the associated instruction is suspended after being processed by the decode stage.

26. The method of claim 24 wherein the associated instruction is suspended in the pipeline's read stage in which instruction operands are read from storage and presented to instruction execution logic.

27. The method of claim 19 wherein at least one first indication is obtained when the associated instruction is accessing a first resource and the first resource is unavailable to the associated instruction, and at least one second indication is obtained when the associated instruction is accessing a second resource and the second resource is unavailable to the associated instruction.

28. The method of claim 27 wherein the first resource is a request FIFO for storing requests to process network data, and for at least one first indication the associated instruction is an instruction to read the request FIFO.

29. The method of claim 27 wherein the first resource is a command FIFO for storing commands for processing of network data, and for at least one first indication the associated instruction is an instruction to write one or more commands to the command FIFO.

30. The method of claim 27 wherein the first resource is a status FIFO for storing status information on reception of network data over a network, and for at least one first indication the associated instruction is an instruction to read the status FIFO.

31. The processor of claim 27 wherein when the associated task becomes suspended on obtaining the first indication, the associated instruction is canceled and the associated instruction is re-executed when the resource becomes available.

32. The method of claim 19 wherein at least one first indication is obtained when the associated instruction is to access an unavailable resource, and the associated task remains suspended until the resource becomes available.

33. The method of claim 32 wherein the associated instruction is re-executed when the resource becomes available.

34. The method of claim 32 wherein the resource is a FIFO shared by the associated task and at least one other task.

35. The method of claim 32 further comprising, on obtaining the first indication, executing the associated instruction to completion when the resource becomes available.

36. The method of claim 19 further comprising, for at least one first indication re-executing the associated instruction when the associated task becomes unsuspended and scheduled again for execution.

37. The method of claim 19 wherein for each first indication, the processor is operable to execute the associated instruction to completion when the associated task becomes unsuspended and scheduled again for execution.

* * * * *